(12) United States Patent
Kim et al.

(10) Patent No.: US 11,949,067 B2
(45) Date of Patent: Apr. 2, 2024

(54) OXIDE, METHOD OF PREPARING THE SAME, SOLID ELECTROLYTE INCLUDING THE OXIDE, AND ELECTROCHEMICAL DEVICE INCLUDING THE OXIDE

(71) Applicant: Samsung Electronics Co., Ltd., Suwon-si (KR)

(72) Inventors: Ryounghee Kim, Uiwang-si (KR); Gabin Yoon, Seoul (KR); Jusik Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 181 days.

(21) Appl. No.: 17/467,749

(22) Filed: Sep. 7, 2021

(65) Prior Publication Data

US 2022/0158229 A1    May 19, 2022

(30) Foreign Application Priority Data

Nov. 13, 2020 (KR) .......... 10-2020-0152287
Jul. 27, 2021 (KR) .......... 10-2021-0098680

(51) Int. Cl.
  *H01M 10/0562* (2010.01)
  *H01M 10/0525* (2010.01)

(52) U.S. Cl.
  CPC ... *H01M 10/0562* (2013.01); *H01M 10/0525* (2013.01); *H01M 2300/0071* (2013.01)

(58) Field of Classification Search
  None
  See application file for complete search history.

(56) References Cited

U.S. PATENT DOCUMENTS

| 4,009,092 A | 2/1977 | Taylor |
| 6,402,795 B1 | 6/2002 | Chu et al. |

(Continued)

FOREIGN PATENT DOCUMENTS

| CN | 103474656 A | 12/2013 |
| CN | 105811006 A | 7/2016 |

(Continued)

OTHER PUBLICATIONS

Ishigaki et al., Solid State Ionics, 351 (2020), 115314. (Year: 2020).*

(Continued)

*Primary Examiner* — Eli S Mekhlin
(74) *Attorney, Agent, or Firm* — CANTOR COLBURN LLP

(57) ABSTRACT

Provided are an oxide including a compound represented by Formula 1, a method of preparing the same, a solid electrolyte including the oxide, and an electrochemical device including the oxide:

$$Li_aTa_{2-y}A_yP_{1-x}M_xO_{8-z}X_z \qquad \text{Formula 1}$$

wherein, in Formula 1, M is an element having an oxidation number of +3,
A is an element having an oxidation number of +4, +5, or +6, or a combination thereof,
when A is an element having an oxidation number of +4, a is $1+y+2x-z$,
when A is an element having an oxidation number of +5, a is $1+2x-z$,
when A is an element having an oxidation number of +6, a is $1-y+2x-z$,
X is a halogen atom or a pseudohalogen, and
$0 \leq y < 0.6$, $0 \leq x < 1$, and $0 \leq z < 1$, with the proviso that x, y and z are not 0 at the same time.

29 Claims, 18 Drawing Sheets

(56) References Cited

U.S. PATENT DOCUMENTS

| | | | |
|---|---|---|---|
| 6,485,622 | B1 | 11/2002 | Fu |
| 7,514,181 | B2 | 4/2009 | Ugaji et al. |
| 7,901,658 | B2 | 3/2011 | Weppner |
| 8,828,580 | B2 | 9/2014 | Visco et al. |
| 9,490,500 | B2 | 11/2016 | Shin et al. |
| 10,128,533 | B2 | 11/2018 | Yamamoto et al. |
| 2016/0020458 | A1 | 1/2016 | Choi et al. |
| 2016/0181657 | A1 | 6/2016 | Kawaji et al. |
| 2016/0211498 | A1 | 7/2016 | Kim et al. |
| 2018/0006326 | A1 | 1/2018 | O'Neill et al. |
| 2018/0006328 | A1 | 1/2018 | O'Neill et al. |
| 2018/0159172 | A1 | 6/2018 | O'Neill et al. |
| 2018/0248201 | A1 | 8/2018 | Shimoda et al. |
| 2019/0067695 | A1 | 2/2019 | Ito et al. |
| 2019/0157723 | A1* | 5/2019 | Suzuki .................. H01M 10/44 |
| 2019/0207252 | A1 | 7/2019 | Badding et al. |
| 2020/0373613 | A1 | 11/2020 | Kim et al. |
| 2021/0202988 | A1 | 7/2021 | Kim et al. |
| 2021/0408576 | A1 | 12/2021 | Kim et al. |
| 2023/0178796 | A1* | 6/2023 | Sei ...................... H01M 10/052 429/322 |
| 2023/0353848 | A1 | 11/2023 | Lee et al. |

FOREIGN PATENT DOCUMENTS

| | | |
|---|---|---|
| CN | 108511794 A | 9/2018 |
| CN | 109888374 A | 6/2019 |
| EP | 3621130 A | 3/2020 |
| EP | 3932860 A1 | 1/2022 |
| JP | 6321443 B2 | 5/2018 |
| KR | 20160010297 A | 1/2016 |
| KR | 1020160113842 A | 10/2016 |
| KR | 101909727 B1 | 10/2018 |
| KR | 101940240 B1 | 1/2019 |
| KR | 102101271 B1 | 4/2020 |
| TW | 201711249 A | 3/2017 |
| WO | 2012147837 A1 | 11/2012 |
| WO | 2020036290 A1 | 2/2020 |

OTHER PUBLICATIONS

Liu et al., ACS Materials. Lett., 2020, 2, 665-670. (Year: 2020).*
European Search Report for European Patent Application No. 21189561.0 dated Feb. 9, 2022.
Fiaz Hussain et al., "Theoretical Insights into Li-Ion Transport in LiTa2PO8," The Journal of Physical Chemistry C, Jul. 23, 2019, pp. 19282-19287, vol. 123.
Jaegyeom Kim et al., "LiTa2PO8: a fast lithium-ion conductor with new framework structure," Journal of Materials Chemistry A, Oct. 29, 2018, pp. 22478-22482, vol. 6.
Jaegyeom Kim, "Synthesis, crystal structures, and ionic transport properties of three-dimensional framework oxides, ATa2PO8 (A=H, Li, and Na)," Graduate School of Ajou University, Department of Energy Systems Research Applied Chemistry, Feb. 2019, pp. 1-127.
Norikazu Ishigakia et al. "Structural and Li-ion diffusion properties of lithium tantalum phosphate LiTa2PO8," Solid State Ionics, 2020, pp. 1-6, vol. 351, No. 115314.
Zhongliang Xiao et al., "LiTa2PO8 coated nickel-rich cathode material for improved electrochemical performance at high voltage," Ceramics International, 2020, pp. 8328-8333, vol. 46.
Jaegyeom Kim et al., "LiTa2PO8: A Fast Lithium-ion Conductor with New Framework Structure," Electronic Supplementary Material (ESI) for Journal of Materials Chemistry A, 2018, pp. S1-S11.
Jaegyeom Kim et al., "LiTa2PO8: a fast lithium-ion conductor with new framework structure," Journal of Materials Chemistry A, Oct. 29, 2018, pp. 22478-22482, vol. 6, DOI: 10.1039/c8ta09170f.
Jürgen Janek et al., "A solid future for battery development," Nature Energy, Sep. 2016, pp. 1-4, vol. 1, DOI: 10.1038/NENERGY.2016. 141.
Lincoln J. Miara et al., "First-Principles Studies on Cation Dopants and Electrolyte|Cathode Interphases for Lithium Garnets," Chemistry of Materials, Apr. 30, 2015, vol. 27, pp. 4040-4047.
M. V. Sukhanov et al., "Synthesis and Structure of New Framework Phosphates Li 1/4 M 7/4 (PO4)3(M=Nb, Ta)," Crystallography Reports, 2008, pp. 974-980, vol. 53, No. 6, DOI: 10.1134/S1063774508060102.
Mohammed Isah Kimpa et al., "Physical characterization and electrical conductivity of Li1.2Ti1.8Al0.2(PO4)3 and Li1.2Ta0. 9Al1.1(PO4)3 NASICON material," International Journal of Integrated Engineering: Special Issue 2018, Dec. 31, 2018, pp. 108-112, vol. 10, No. 9.
Zhang, Z., et al., "New horizons for inorganic solid state ion conductors," Energy & Environmental Science, vol. 11, pp. 1945-1976, Jun. 11, 2018.
Chinese Office Action for Chinese Patent Application No. 202010442550.4 dated Dec. 21, 2023.

* cited by examiner

OXIDE, METHOD OF PREPARING THE SAME, SOLID ELECTROLYTE INCLUDING THE OXIDE, AND ELECTROCHEMICAL DEVICE INCLUDING THE OXIDE

CROSS-REFERENCE TO RELATED APPLICATION

This application claims priority to Korean Patent Application No. 10-2020-0152287, filed on Nov. 13, 2020, and Korean Patent Application No. 10-2021-0098680, filed on Jul. 27, 2021, in the Korean Intellectual Property Office, and all the benefits accruing therefrom under 35 U.S.C. § 119, the content of both of which are incorporated herein by reference in their entirety.

BACKGROUND

1. Field

The present disclosure relates to an oxide, a method of preparing the same, a solid electrolyte including the oxide, and an electrochemical device including the oxide.

2. Description of Related Art

Lithium secondary batteries have large electrochemical capacity, high operating potential, and excellent cycle characteristics, and thus the demand therefor is increasing in applications including portable information terminals, portable electronic devices, small household power storage devices, motorcycles, electric vehicles, and hybrid electric vehicles. With the spread of such applications, there is a demand for improvement in safety and performance of lithium secondary batteries.

Conventional lithium secondary batteries use a liquid electrolyte. Accordingly, when exposed to water in the air, they may be ignited resulting in long-lasting stability issues. The stability issues are becoming more and more critical as electric vehicles enter markets. Accordingly, in recent years, for the purpose of improving safety, research on an all-solid-state secondary battery using a solid electrolyte made of inorganic materials has been actively conducted. All-solid-state secondary batteries are attracting attention as next-generation secondary batteries from the viewpoint of stability, high energy density, high output, long lifespan, simplification of manufacturing processes, increased-size, compact, and low-cost batteries.

An all-solid secondary battery includes a positive electrode, a solid electrolyte and a negative electrode. Desired is a solid electrolyte having high ionic conductivity and low electronic conductivity. Solid electrolytes of all-solid secondary batteries include sulfide solid electrolytes and oxide solid electrolytes. Oxide-based solid electrolytes do not generate toxic substances during the manufacturing process, and have excellent material stability, but they can have a lower ionic conductivity at room temperature than sulfide-based materials. Therefore, research has been heavily focused on developing an oxide-based composition that exhibits high ionic conductivity at room temperature.

SUMMARY

Provided are an oxide with high ionic conductivity at room temperature and improved lithium stability and a method for producing the same.

Provided is a solid electrolyte including the oxide.

Provided is an electrochemical device including the oxide.

Additional aspects will be set forth in part in the description that follows and, in part, will be apparent from the description, or may be learned by practice of the presented embodiments of the disclosure.

According to an aspect of an embodiment, an oxide includes a compound represented by Formula 1:

$$Li_aTa_{2-y}A_yP_{1-x}M_xO_{8-z}X_Z \qquad \text{Formula 1}$$

wherein in Formula 1, M is an element having an oxidation number of +3,

A is an element having an oxidation number of +4, +5, or +6, or a combination thereof, when A is an element having an oxidation number of +4, a is 1+y+2x−z, when A is an element having an oxidation number of +5, a is 1+2x−z, when A is an element having an oxidation number of +6, a is 1−y+2x−z, X is a halogen atom, a pseudohalogen, or a combination thereof, and 0≤y<0.6, 0≤x<1, and 0≤z<1, with the proviso that x, y and z are not 0 at the same time.

In Formula 1, 0<x+y+z<2.6.

According to an aspect of an embodiment, a protected positive electrode comprises a positive electrode layer; and a solid electrolyte comprising the oxide on the positive electrode layer.

According to an aspect of an embodiment, an electrochemical device includes a positive electrode layer; a solid electrolyte layer comprising the oxide on the positive electrode layer; and a negative electrode layer on the solid electrolyte.

According to an aspect of an embodiment, an electrochemical cell includes a positive electrode layer including a positive electrode current collector and a positive active material layer disposed on the positive electrode current collector; a negative electrode layer including a negative electrode current collector and a first negative active material layer disposed on the negative electrode current collector; and a solid electrolyte layer containing a solid electrolyte disposed between the positive electrode layer and the negative electrode layer, wherein the positive active material layer, the solid electrolyte layer, or a combination thereof comprises the oxide.

According to an aspect of an embodiment, a method of preparing an oxide comprises: mixing a lithium precursor, a tantalum precursor, an M precursor, and a phosphorus precursor to provide a precursor mixture; and heat-treating the precursor mixture in an oxidizing gas atmosphere to form the oxide, the oxide comprising a compound of Formula 1

$$Li_aTa_{2-y}A_yP_{1-x}M_xO_{8-z}X_Z \qquad \text{Formula 1}$$

wherein in Formula 1, M is an element having an oxidation number of +3,

A is an element having an oxidation number of +4, +5, or +6, or a combination thereof, when A is an element having an oxidation number of +4, a is 1+y+2x−z, when A is an element having an oxidation number of +5, a is 1+2x−z, when A is an element having an oxidation number of +6, a is 1−y+2x−z, X is a halogen atom, a pseudohalogen, or a combination thereof, and 0≤y<0.6, 0≤x<1, and 0≤z<1, with the proviso that x, y and z are not 0 at the same time.

In Formula 1, 0<x+y+z<2.6.

When the precursor mixture is prepared, an A precursor and/or an X precursor may be further added.

Also disclosed is a method of manufacturing an electrochemical cell, the method comprising: providing a positive electrode layer comprising a positive electrode current collector and a positive active material layer disposed on the positive electrode current collector; providing a negative electrode layer comprising a negative electrode current collector and a first negative active material layer disposed on the negative electrode current collector; and disposing a solid electrolyte layer between the positive electrode layer and the negative electrode layer to manufacture the electrochemical cell, the solid electrolyte layer comprising a solid electrolyte, wherein at least one of the positive active material layer or the solid electrolyte layer comprises the oxide.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
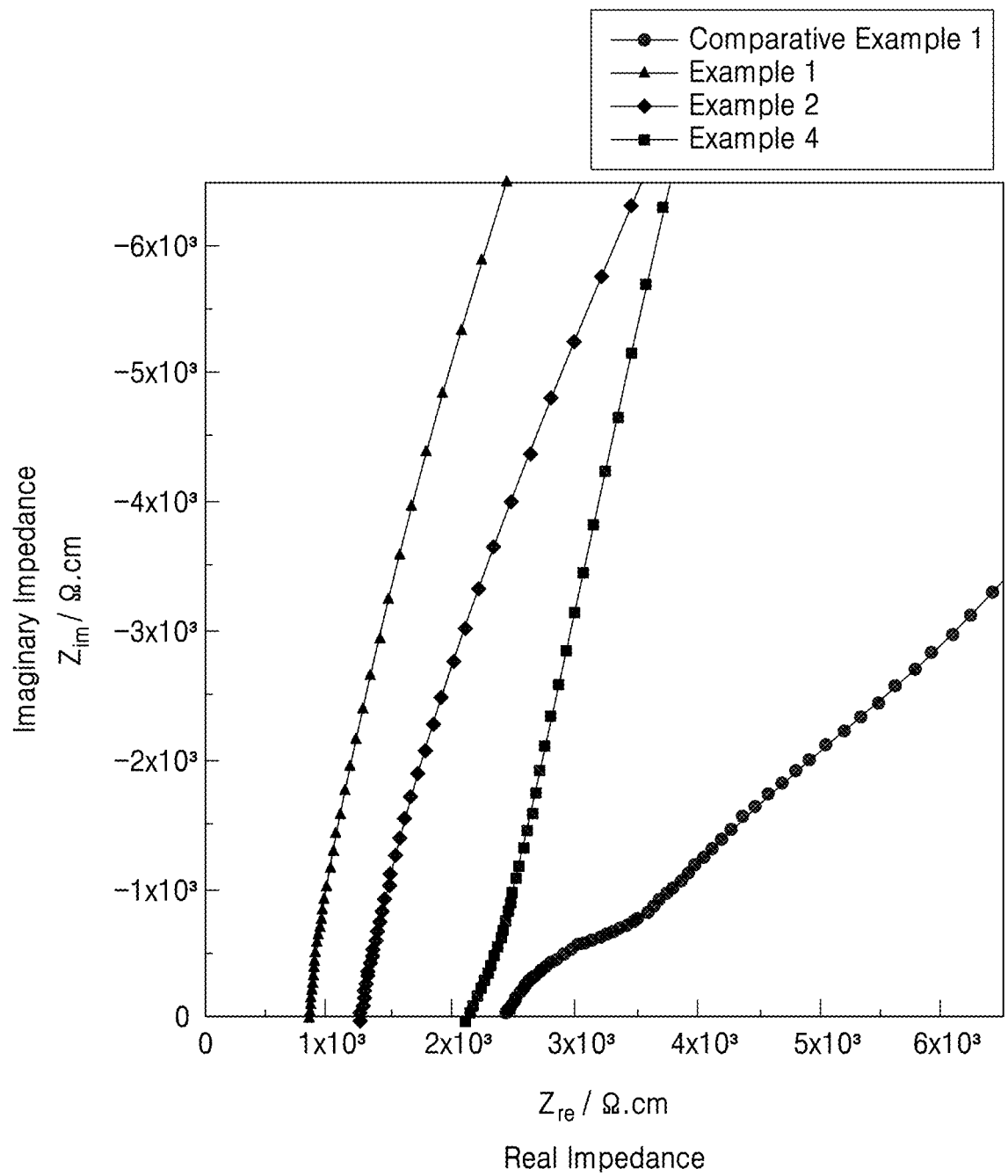
FIG. 1A is a graph of imaginary impedance ($Z_{im}$, ohm centimeter, Ω-cm) versus real impedance ($Z_{re}$, ohm centimeter, Ω-cm) showing impedance characteristics of oxides according to Example 1, Example 2, Example 4, and Comparative Example 1 at 25° C.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Ionic conductivity may be determined by complex impedance at 20° C., further details of which can be found in J.-M. Winand et al., "Measurement of Ionic Conductivity in Solid Electrolytes," Europhysics Letters, vol. 8, no. 5, p. 447-452, 1989.

Hereinafter, an oxide, a method of preparing the same, a solid electrolyte including the oxide, and an electrochemical device including the oxide, according to embodiments will be described in more detail.

Provided is an oxide comprising a compound represented by Formula 1:

$$Li_aTa_{2-y}A_yP_{1-x}M_xO_{8-z}X_z \qquad \text{Formula 1}$$

In Formula 1, M is an element having an oxidization number of +3 oxidation number, A is an element having an oxidation number of +4, +5, or +6, or a combination thereof, when A is an element having an oxidation number of +4, a is 1+y+2x−z, when A is an element having an oxidation number of +5, a is 1+2x−z, when A is an element having an oxidation number of +6, a is 1−y+2x−z, X may be a halogen atom, a pseudohalogen, or a combination thereof, and 0≤y<0.6, 0≤x<1, and 0≤z<1, with the proviso that x, y and z are not 0 at the same time.

In Formula 1, 0<x+y+z<2.6.

The compound of Formula 1 may be a compound of Formula 1-1, a compound of Formula 1-2, or a compound of Formula 1-3.

$$Li_{1+y+2x-z}Ta_{2-y}A_yP_{1-x}M_xO_{8-z}X_z \qquad \text{Formula 1-1}$$

In Formula 1-1, M is an element having an oxidation number of +3,

A is an element having an oxidation number of +4,

X may be a halogen atom or a pseudohalogen, and

0≤y<0.6, 0≤x<1, 0≤z<1, with the proviso that x, y and z are not 0 at the same time.

In Formula 1-1, 0<x+y+z<2.6.

$$Li_{(1+2x-z)}Ta_{2-y}A_yP_{1-x}M_xO_{8-z}X_z \qquad \text{Formula 1-2}$$

In Formula 1-2, M is an element having an oxidation number of +3,

A is an element having an oxidation number of +5,

X may be a halogen atom or a pseudohalogen, and

0≤y<0.6, 0≤x<1, and 0≤z<1, with the proviso that x, y and z are not 0 at the same time.

In Formula 1-2, 0<x+y+z<2.6.

$$Li_{(1-y+2x-z)}Ta_{2-y}A_yP_{1-x}M_xO_{8-z}X_z \qquad \text{Formula 1-3}$$

In Formula 1-3, M is an element having an oxidation number of +3,

A is an element having an oxidation number of +6,

X may be a halogen atom or a pseudohalogen, and

0≤y<0.6, 0≤x<1, and 0≤z<1, with the proviso that x, y and z are not 0 at the same time.

In Formula 1-3, 0<x+y+z<2.6.

An example of an oxide-based electrolyte is $LiTa_2PO_8$, a lithium tantalum phosphate-based compound. However, in order to make an all-solid battery using $LiTa_2PO_8$ as an oxide-based electrolyte, it is desirable to further increase its ionic conductivity. In addition when $LiTa_2PO_8$ is used as a solid electrolyte for a positive electrode, there is a need to provide improved room-temperature ionic conductivity while lowering the synthesis temperature of the $LiTa_2PO_8$.

To this end, the inventors of the present application introduced M, an element having an oxidation number of +3, to the phosphorus (P) tetrahedral site of $LiTa_2PO_8$. While not wanting to be bound by theory, it is understood that introduction of M results in M on the P tetrahedral sites, resulting in an increase in the concentration of lithium carriers, increased lithium migration paths, and thus increased ionic conductivity and improved lithium stability.

The compound of Formula 1 according to an embodiment is a lithium tantalum phosphate-based compound in which some positions of phosphorus (P) are substituted with M having the oxidation number of +3, as described above. While not wanting to be bound by theory, it is understood that by using an M precursor of which a decomposition temperature is low, abnormal crystal growth is suppressed, and the crystals are induced to grow uniformly. Accordingly, the grain boundary resistance of the ion conductor is reduced, and the ion conductivity is high. In addition, compared to a lithium tantalum phosphate-based compound $LiTa_2PO_8$ of the related art, the lithium tantalum phosphate-based compound as described above may have a relatively lower phase formation temperature.

The phase formation temperature of the compound represented by Formula 1 may be about 1,150° C. or less, about 1,100° C. or less, about 1,050° C. or less, or about 1,000° C. or less.

In an embodiment, the phase formation temperature of the compound of Formula 1 may be, for example, from about 900 to about 1,150° C., from about 1,000 to about 1,150° C., from about 1,050 to about 1,150° C., or from about 1,100 to about 1,150° C. Also, LiTa$_2$PO$_8$ has a phase formation temperature of about 1200° C., which is higher than that of the compound of Formula 1.

The term "phase formation temperature" used herein refers to a temperature at which an alpha-phase lithium tantalum phosphate-based compound is formed, e.g., when determined by in-situ XRD analysis. Alpha-phase lithium tantalum phosphate-based compounds have a crystal structure having monoclinic symmetry and have high ionic conductivity.

M in Formula 1 may be, for example, tungsten (W), niobium (Nb), vanadium (V), antimony (Sb), chromium (Cr), molybdenum (Mo), neodymium (Nd), technetium (Tc), bismuth (Bi), indium (In), gallium (Ga), or a combination thereof.

In an embodiment, y and z in Formula 1 may be 0.

An element A having an oxidation number of +4, +5 or +6 may be introduced into the tantalum (Ta) octahedral site of LiTa$_2$PO$_8$. As such, A in Formula 1 may be substituted for and may reside on a tantalum site, e.g., replace some of the tantalum. As A in Formula 1, the element having the oxidation number of +4 may be, for example, titanium, zirconium, hafnium, tellurium (Te), selenium (Se), or a combination thereof. As A, the element of oxidation number +5 may be, for example, tungsten (W), niobium (Nb), vanadium (V), antimony (Sb), chromium (Cr), molybdenum (Mo), neodymium (Nd), technetium (Tc), bismuth (Bi), or a combination thereof.

As A, the element of the oxidation number of +6 may be, for example, tungsten (W), molybdenum (Mo), chromium (Cr), ruthenium (Ru), tellurium (Te), selenium (Se), or a combination thereof.

In order to implement an all-solid secondary battery using the oxide according to the embodiment as a solid electrolyte, the phase formation temperature of the oxide is desirably reduced. In the case in which the phase formation temperature of the oxide is reduced as described above, when a positive electrode layer is manufactured using the oxide as a solid electrolyte for the positive electrode layer, the diffusion of metal to other components of the all-solid secondary battery may be prevented.

The term "pseudohalogen" refers to a molecule including two or more electronegative atoms resembling a halogen when in a free state, and generates anions similar to a halogen ions. Examples of pseudohalogens are cyanide (CN), cyanate (OCN), thiocyanate (SCN), azide (N$_3$), or a combination thereof.

The compound represented by Formula 1 may be a compound represented by Formula 2 below or a compound represented by Formula 2-1.

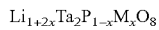     Formula 2

M in Formula 2 may be an element having an oxidation number of +3, and 0≤x≤0.5,

     Formula 2-1

M in Formula 2-1 may be an element having an oxidation number of +3.

In Formula 1, x may satisfy the condition of 0≤x<0.5.

M in Formula 2 or 2-1 may be boron (B), aluminum (Al), gallium (Ga), indium (In), antimony (Sb), or a combination thereof. In an aspect, x may be greater than 0 and equal to or less than 0.3, or x may be from 0.1 to 0.3.

In Formulae 1 or 2, x may be, for example, greater than 0 and equal to or less than 0.5, greater than 0 and less than 0.5, greater than or equal to 0.1 and less than 0.5, or from about 0.1 to about 0.2.

In Formula 1, y may be greater than 0 and equal to or less than 0.5, for example, from about 0.1 to about 0.5, or from about 0.1 to about 0.2.

In Formula 1, X may replace some of the oxygen. In an aspect, for example, X is chlorine (Cl), bromine (Br), fluorine (F), cyanide (CN), cyanate (OCN), thiocyanate, or a combination thereof. In an embodiment, X is thiocyanate (SCN), azide (N$_3$), or a combination thereof. In Formulae 1 and 2, z may be greater than 0 and equal to or less than 0.9, for example, from about 0.01 to about 0.8, from about 0.01 to about 0.7, from about 0.01 to about 0.6, from about 0.01 to about 0.5, from about 0.01 to about 0.2, or from about 0.05 to about 0.15.

The term "oxidation number" used herein may refer to an average oxidation number.

The oxide according to an embodiment may be a lithium ion conductor or a lithium ion conductive solid electrolyte.

In an embodiment, a halogen atom, such as chlorine or fluorine, or a pseudohalogen may be introduced at the oxygen (O) site of the oxide. As such, when the oxide containing a halogen atom or a pseudohalogen is used in the manufacture of a solid electrolyte, a passivation layer may be formed between a lithium metal electrode and a solid electrolyte containing the oxide according to the embodiment, and thus, lithium stability of the solid electrolyte may be improved. Further, LiF or LiCl may be present at or in the grain boundary of the solid electrolyte, so the Li ion conductivity at the grain boundary may be increased. For example, fluorine as a halogen atom may be introduced at the oxygen (O) site of the oxide, the passivation layer contains fluorine.

The oxide according to an embodiment is a lithium ion conductor. The oxide is a LiTa$_2$PO$_8$ compound, and it has a monoclinic crystal structure with a space group of c2/c, in which two [MO$_6$] octahedrons and one [PO$_4$] tetrahedron are a corner sharing, e.g., share an oxygen vertex.

The crystal structure of the compound of Formula 1 according to an embodiment is as follows.

Ta is 6-coordinated by oxygen to form a TaO$_6$ octahedral unit, P is 4-coordinated by oxygen, and M replaces some of P and resides on a P site to form a P$_{1-x}$M$_x$O$_4$ tetrahedral unit. In P$_{1-x}$M$_x$O$_4$, x may be as defined in Formula 1. An oxide according to the embodiment includes a first lattice layer formed of TaO$_6$ octahedral units in a quadrilateral lattice shape along a first plane; a second lattice layer formed of the TaO$_6$ octahedral units linked to each other in a quadrilateral lattice shape along a second plane parallel to the first plane; and a linking layer including trimer link units, in each of which one TaO$_6$ octahedral unit and two P$_{1-x}$M$_x$O$_4$ tetrahedral units, and the TaO$_6$ octahedral unit is linked to the two P$_{1-x}$M$_x$O$_4$ tetrahedral units are included by sharing two vertices, interposed between the first lattice layer and the second lattice layer, and binding to TaO$_6$ octahedral units of the first lattice layer and TaO$_6$ octahedral units of the second lattice layer, wherein Li may be placed in the space between the TaO$_6$ octahedral units and P$_{1-x}$M$_x$O$_4$ tetrahedral units.

For each of the first and second lattice layers, eight TaO$_6$ octahedral units are arranged at positions corresponding to the four vertices and four sides of a quadrilateral, TaO$_6$ octahedral units located at positions corresponding to four vertices may be linked to four TaO$_6$ octahedral units adjacent thereto by sharing vertices, thereby forming a first octahedral unit (a first lattice layer), and TaO$_6$ octahedral units located at positions corresponding to four sides may be linked to two $TaO_6$ octahedral units adjacent thereto by sharing vertices, thereby forming a second octahedral unit (a second lattice layer).

In an embodiment, the second lattice layer may be shifted by a first interval and a second interval, compared to the first lattice layer, on a first axis and a second axis respectively defining the first plane and the second plane.

In an embodiment, the $TaO_6$ octahedral unit of the trimer link unit may be linked to two second octahedral units respectively located at two sides connected to a first vertex of a first quadrilateral of the first lattice layer and two second octahedral units respectively located at two sides connected to a second vertex, opposite to a first vertex, of a second quadrilateral of the second lattice layer by sharing vertices therewith. One of the two $P_{1-x}M_xO_4$ tetrahedral units of the trimer link unit may be linked to two second octahedral units respectively located at positions corresponding to two sides connected to a second vertex of the first quadrilateral and one first octahedral unit located at a position corresponding to the second vertex of the second quadrilateral by sharing vertices therewith, and the other of the two $P_{1-x}M_xO_4$ tetrahedral units of the trimer link unit may be linked to one first octahedral unit located at a position corresponding to the first vertex of the first quadrilateral and two second octahedral units respectively located at positions corresponding to two sides connected to the first vertex of the second quadrilateral by sharing vertices therewith.

Each of the first and second lattice layers may have a composition stoichiometrically corresponding to $[Ta_3O_{18/2}]^{3-}$, and the linking layer may have a composition stoichiometrically corresponding to $[Ta_2O_{14/2}]^+$. Lithium ions may be placed in the space between $TaO_6$ octahedral units and $P_{1-x}M_xO_4$ tetrahedral units.

An oxide according to an embodiment may be electrically neutral.

The compound of Formula 1 may be a compound represented by Formula 1-4 below. The compound of Formula 1-4 may have a complex form in which LiX, such as LiCl, is added to $Li_aTa_{2-x}A_xP_{1-y}M_yO_8$ in the form of an additive. In $Li_aTa_{2-x}A_xP_{1-y}M_yO_8$, a may be the same as defined in Formula 1.

$Li_aTa_{2-x}A_xP_{1-y}M_yO_8 \cdot zLiX$   Formula 1-4

In Formula 1-4, M, A, a, x, y, z, and X may be as defined in Formula 1.

The compound represented by Formula 1 may be a compound represented by Formula 2.

$Li_{1+2x}Ta_2P_{1-x}M_xO_8$   Formula 2

M in Formula 2 may be an element having an oxidation number of +3, and $0 \leq x < 0.5$.

In Formula 2, $0 \leq x \leq 0.5$, $0 < x < 0.5$, $0 < x \leq 0.3$, or $0.1 \leq x \leq 0.3$.

The compound represented by Formula 1 may be a compound represented by Formula 2-1.

$LiTa_2PO_8 \cdot M_2O_3$   Formula 2-1

M in Formula 2-1 may be an element having an oxidation number of +3.

M in Formula 2-1 may be B, Sb, Al, Ga, or Ta.

The compound of Formula 2 may be a compound represented by, for example, Formula 2-2 or 2-3.

$Li_{1+2x}Ta_2P_{1-x}B_xO_8$   Formula 2-2

$Li_{1+2x}Ta_2P_{1-x}Sb_xO_8$   Formula 2-3

In Formulae 2-2 and 2-3, $0 \leq x \leq 0.5$, $0 < x < 0.5$, $0 < x \leq 0.3$, or $0.1 \leq x \leq 0.3$.

The compound of Formula 2-1 may be, for example, $LiTa_2PO_8 \cdot B_2O_3$, $LiTa_2PO_8 \cdot Sb_2O_3$, $LiTa_2PO_8 \cdot Al_2O_3$, $LiTa_2PO_8 \cdot Ga_2O_3$, or $LiTa_2PO_8 \cdot In_2O_3$.

The compound represented by Formula 1 may be a compound represented by Formula 2, a compound represented by Formula 2-1, or a combination thereof.

In Formula 2, x may be, for example, greater than 0 and equal to or less than 0.5, greater than 0 and less than 0.5, equal to or greater than 0.1 and less than 0.5, or from about 0.1 to about 0.2.

In Formula 2, y may be greater than 0 and equal to or less than 0.5, for example, from about 0.1 to about 0.5, from about 0.1 to about 0.2. z may be greater than 0 and equal to or less than 0.9, for example, from about 0.01 to about 0.8, from about 0.01 to about 0.7, from about 0.01 to about 0.6, from about 0.01 to about 0.5, from about 0.01 to about 0.2, or from about 0.05 to about 0.15.

When an element having an oxidation number of +3, such as B or Sb, is introduced into the $[PO_4]$ tetrahedron, instead of P having an oxidation number of +5, excess $Li^+$ is introduced to match the electrical neutrality of a compound, the amount of movable $Li^+$ is increased, and thus, the lithium ion conductivity may be increased.

When the anion X is substituted for some of the oxygen, a passive layer containing the anion, e.g., F, may be formed to improve lithium stability, and LiF or LiCl may be present in the grain boundary region, resulting in an increase in the Li ion conductivity at the grain boundary.

The compound of Formula 1 may be, for example, $Li_{1.4}Ta_2P_{0.8}In_{0.2}O_8$, $Li_{1.6}Ta_2P_{0.7}In_{0.3}O_8$, $Li_{1.4}Ta_2P_{0.8}Ga_{0.2}O_8$, $Li_{1.6}Ta_2P_{0.7}Ga_{0.3}O_8$, $Li_{1.25}Ta_2P_{0.875}B_{0.125}O_8$, $Li_{1.6}Ta_2P_{0.75}B_{0.25}O_8$, $Li_{1.2}Ta_2P_{0.9}B_{0.1}O_8$, $Li_{1.4}Ta_2P_{0.3}B_{0.2}O_8$, $Li_{1.6}Ta_2P_{0.7}B_{0.3}O_8$, $Li_{1.8}Ta_2P_{0.6}B_{0.4}O_8$, $Li_2Ta_2P_{0.5}B_{0.5}O_8$, $Li_{1.1}Ta_2P_{0.9}B_{0.1}O_{7.9}Cl_{0.1}$, $Li_{1.15}Ta_2P_{0.9}B_{0.1}O_{7.95}Cl_{0.05}$, $Li_{1.2}Ta_2P_{0.9}Sb_{0.1}O_8$, $Li_{1.4}Ta_2P_{0.8}Sb_{0.2}O_8$, $Li_{1.6}Ta_2P_{0.7}Sb_{0.3}O_8$, $Li_{1.8}Ta_2P_{0.6}Sb_{0.4}O_8$, $Li_2Ta_2P_{0.5}Sb_{0.5}O_8$, $Li_{1.25}Ta_2P_{0.875}Sb_{0.125}O_8$, $Li_{1.1}Ta_2P_{0.9}Sb_{0.1}O_{7.9}Cl_{0.1}$, $Li_{1.15}Ta_2P_{0.9}Sb_{0.1}O_{7.95}Cl_{0.05}$, $Li_{1.2}Ta_2P_{0.9}Ga_{0.1}O_8$, $Li_{1.4}Ta_2P_{0.8}Ga_{0.2}O_8$, $Li_{1.6}Ta_2P_{0.7}Ga_{0.3}O_8$, $Li_{1.8}Ta_2P_{0.6}Ga_{0.4}O_8$, $Li_2Ta_2P_{0.5}Ga_{0.5}O_8$, $Li_{1.25}Ta_2P_{0.875}Ga_{0.125}O_8$, $Li_{1.1}Ta_2P_{0.9}Ga_{0.1}O_{7.9}Cl_{0.1}$, $Li_{1.15}Ta_2P_{0.9}Ga_{0.1}O_{7.95}Cl_{0.05}$, $Li_{1.2}Ta_2P_{0.9}In_{0.1}O_8$, $Li_{1.4}Ta_2P_{0.8}In_{0.2}O_8$, $Li_{1.6}Ta_2P_{0.7}In_{0.3}O_8$, $Li_{1.8}Ta_2P_{0.6}In_{0.4}O_8$, $Li_2Ta_2P_{0.5}In_{0.5}O_8$, $Li_{1.25}Ta_2P_{0.875}In_{0.125}O_8$, $Li_{1.1}Ta_2P_{0.9}In_{0.1}O_{7.9}Cl_{0.1}$, $Li_{1.15}Ta_2P_{0.9}In_{0.1}O_{7.95}Cl_{0.05}$, $Li_{1.25}Ta_{1.4}V_{0.6}P_{0.875}Sb_{0.125}O_8$, $Li_{1.1}Ta_{1.95}In_{0.05}PO_8$, or a combination thereof.

For the oxide according to the embodiment, the isotropy of ionic conductivity is improved.

In general lithium ion conductors, ion conduction occurs very quickly in the z-axis direction compared to the x-axis and y-axis directions (c(z axis)>>b(y axis) & a(x axis)).

However, in the oxide according to the embodiment, the anisotropy of the ion conduction path and ion conductivity, which were fast only in c(z-axis) in general lithium ion conductors, is reduced to the level of c(z axis)>b(y axis)>a(x axis), that is, the anisotropy may be reduced to improve the isotropy of the ionic conductivity.

In the present specification, "isotropy of ionic conductivity" refers to the relative diffusivity of lithium ions, and in the disclosed material the diffusivity is reduced in the order of c(z axis) direction, b(y axis) direction and a(x axis) direction, and thus, the difference from among them is reduced and the anisotropy of ionic conductivity is reduced, and the isotropy thereof is improved.

The improvement in the isotropy of the ionic conductivity of the oxide according to the embodiment may be supported by calculation results obtained by calculating the diffusivity (D, unit: cm$^2$/S) and mean-square displacements (MSD) due to the diffusion of Li ions by a quantum calculation using a nudged elastic band (NEB) method before and after the introduction of the dopant into the oxide. According to these calculation results, the oxide according to the embodiment shows that the mobility increases in the a-axis and the b-axis directions and a decrease in the anisotropy of the diffusivity, resulting in an increase in the overall ionic conductivity. From this result, it can be seen that the oxide according to an embodiment shows the isotropic ionic conductivity characteristics.

The oxide according to an embodiment has a monoclinic crystal structure having a space group of c2/c as described above. The oxide according to an embodiment has peaks at diffraction angles of 17.5θ2θ±0.5° 2θ, 24.8°2θ±0.5°2θ, 24.9°2θ±0.5°2θ, 25.4°2θ±0.5°2θ, and/or 27.8°2θ±0.5°2θ, when determined by X-ray diffraction analysis using CuKα radiation.

The oxide according to an embodiment has peaks at diffraction angles of 17.5°2θ±0.5°2θ, 24.8°2θ±0.5°2θ, 24.9°2θ±0.5°2θ, 25.4°2θ±0.5°2θ, and 27.8°2θ±0.5°2θ, when determined by X-ray diffraction analysis using CuKα radiation.

In the oxide according to an embodiment, a peak appears in the region where the diffraction angle is 25.55°2θ±0.5°2θ, and the peak at the diffraction angle of 25.55°2θ±0.5°2θ is shifted in the right side by about 0.02° to about 0.12°, for example, 0.05°, compared to the peak of LiTa$_2$PO$_8$ at the diffraction angle of 25.5°2θ, when analyzed by X-ray diffraction using CuKα radiation.

Regarding Formula 1-1, an oxide containing LiX such as LiCl may exhibit a characteristic of a shifted X-ray diffraction peak compared to the X-ray diffraction peak of an oxide that does not contain LiX such as LiCl (z=0 in Formula 1). From the shift in the X-ray diffraction peak as described above, it can be seen that X of LiX replaces some of the oxygen and resides on oxygen sites.

The lithium conductor according to the embodiment has an ionic conductivity of about 1×10$^{-2}$ mS/cm or more, for example, from about 1×10$^{-2}$ mS/cm to about 8.0×10$-1$ mS/cm, at room temperature (25° C.). A relative density of the oxide is about 92% or less. As the oxide has such a high ionic conductivity at room temperature, the internal resistance of an electrochemical battery containing such oxide may be further reduced.

In the present specification, an apparent density (g/cc) is first measured by measuring the weight, thickness, and diameter of the oxide, and then the theoretical density (g/cc) value is calculated from the simulation result. Relative density is expressed as a percentage by calculating the ratio of the apparent density to the theoretical density.

The electron conductivity of the oxide may be less than or equal to about 1×10$^{-5}$ mS/cm. The electron conductivity of the oxide may be the electron conductivity at 25° C.

The oxide according to an embodiment has high room-temperature ionic conductivity and low electron conductivity as described above. Accordingly, the oxide may be useful as a solid electrolyte.

When the oxide according to the embodiment is used as an electrode additive, the electron conductivity may have a value greater than about 1×10$^{-5}$ mS/cm compared to the case where the oxide is used as a solid electrolyte.

The oxide according to the embodiment is electrochemically stable at the voltage of 2.01 V to 4.01 V, with respect to lithium metal.

The energy above hull of the compound represented by Formula 1 may be less than or equal to about 50 meV/atom. When the energy above hull of the compound of Formula 1 is within the range, a solid electrolyte with excellent stability may be obtained.

The grain size of the oxide may range from about 5 nanometers (nm) to about 500 μm. When the oxide contains X in Formula 1, the grain size may be reduced, the grain-grain stability may be improved, and grain-to-grain adhesion may be improved.

The oxide according to an embodiment may exist in the state of particles. The average particle diameter of the particles may be from about 5 nm to about 500 μm, for example, from about 100 nm to about 100 μm, from about 1 μm to about 50 μm. The specific surface area of the oxide may be from about 0.01 square meters per gram (m$^2$/g) to about 1,000 m$^2$/g, for example about 0.5 m$^2$/g to about 100 m$^2$/g.

A method of manufacturing the oxide according to the embodiment will be described as follows.

A lithium precursor, a tantalum precursor, an M precursor, and a phosphorus precursor are mixed to obtain a precursor mixture, and the precursor mixture heat treated.

The precursor mixture may further include A precursor, X precursor, or a combination thereof. A precursor may be a precursor containing an element of oxidation number +4, +5, or +6, and the X precursor may be a precursor containing X in Formula 1.

A solvent may be used in the precursor mixture. The solvent may be any suitable material that may dissolve or disperse a lithium precursor, a tantalum precursor, an M precursor, and a phosphorus precursor. The solvent may be, for example, acetone, ethanol, water, ethylene glycol, isopropanol, or a combination thereof. The amount of the solvent may be in the range of about 50 parts by weight to about 1,000 parts by weight, for example, about 100 parts by weight to about 300 parts by weight, based on 100 parts by weight of the total weight of the precursor compound.

The mixing may be carried out by mechanical milling. The mixing may be performed according to methods known in the art, for example, milling, blending, and stirring. The milling may be performed by using, for example, a ball mill, an airjet mill, a bead mill, a roll mill, or a planetary mill.

The heating rate for the mixture during the heat treatment may be from about 1° C./min to about 10° C./min, and the heat-treatment temperature (T$_1$) may be from about 500° C. to about 1,200° C., for example, about 600° C. to about 1,000° C. When the heating rate during the heat treatment step is within these ranges, the heat treatment may be sufficiently performed.

The heat treatment may be performed in an oxidizing gas atmosphere. The oxidizing gas atmosphere may be made by using, for example, air or oxygen. The heat treatment time may vary depending on the heat treatment temperature, and may be, for example, from about 1 hour to about 20 hours, from about 1 hour to about 10 hours, or about 2 hours to about 8 hours.

The heat treatment may be performed in two stages including a first stage heat treatment and a second stage heat treatment performed at a higher temperature than the first heat treatment. The first heat treatment may be performed at about 500° C. to 1000° C., and the second heat treatment may be performed at about 600° C. to about 1200° C. When the heat treatment is performed through two stages, the obtained oxide may have high density.

A process of milling the heat treated product may be further performed after performing the first heat treatment and before performing the second heat treatment. Here, the milling may be, for example, a planetary milling or a hand milling. Due to the milling, the particle size of the heat heated product may be controlled. By performing milling, the particle size of the heat treated product may be controlled to be, for example, less than or equal to 1 μm. When the particle size is controlled in this way, the finally obtained oxide may have improved density.

The term "particle size" used herein indicates the particle diameter when the particle is spherical, and when the particle is not spherical, the particle size may indicate the length of longer axis. The particle size may be determined by light scattering.

The M precursor may be an M element-containing oxide, an M element-containing carbonate, an M element-containing chloride, an M element-containing phosphate, an M element-containing nitrate, an M element-containing hydroxide, or a combination thereof. The M precursor may be, for example, boron oxide ($B_2O_3$), aluminum oxide ($Al_2O_3$), gallium oxide ($Ga_2O_3$), indium oxide ($In_2O_3$), antimony oxide ($Sb_2O_3$), or a combination thereof.

The lithium precursor may be at least one of lithium oxide, lithium carbonate, lithium chloride, lithium sulfide, lithium nitrate ($LiNO_3$), lithium phosphate, or lithium hydroxide.

The tantalum precursor may include, for example, at least one of tantalum hydroxide, tantalum carbonate, tantalum chloride, tantalum sulfate, tantalum nitrate, or tantalum oxide ($Ta_2O_5$).

The phosphorus precursor may be, for example, $(NH_4)_2HPO_4$, $(NH_4)H_2PO_4$, $LiPO_3$, $LiH_2PO_4$, or a combination thereof.

The A precursor may be, for example, an A element-containing oxide, an A element-containing carbonate, an A element-containing chloride, an A element-containing phosphate, an A element-containing hydroxide, an A element-containing nitrate, or a combination thereof, and may be, for example, tungsten oxide, tungsten hydroxide, tungsten chloride, tellurium oxide, tellurium hydroxide, tellurium chloride, selenium oxide, selenium hydroxide, selenium chloride, niobium oxide, niobium hydroxide, niobium chloride, or a combination thereof. The X precursor may be, for example, lithium chloride.

Any suitable combination of the foregoing precursors may be used. The amounts of the lithium precursor, M precursor, tantalum precursor, phosphorus precursor, A precursor and X precursor may be stoichiometrically controlled to obtain the oxide represented by Formula 1.

Then, the heat-treated product may be pulverized to obtain a powder comprising particles. A molded body may be manufactured by further performing a molding process on the powder. The size of the particles obtained by pulverizing may be 10 μm or less. When the size of the pulverized particle is within the range, the particle size is suitably small so that pulverizing and mixing may be sufficiently performed to smoothly form a layered crystal phase. The "size" used herein refers to an average diameter when particles are spherical, and when particles are non-spherical, the size refers to the length of a longer axis. The size may be measured by using a scanning electron microscope or by light scattering using a particle size analyzer.

Then, a heat treatment may be performed on the molded body. The heating rate during the heat treatment may be from about 1° C./min to about 10° C./min. The heat treatment may be performed at the temperature of about 600° C. to about 1100° C., for example, about 1000° C. to about 1100° C. The heat treatment temperature ($T_2$) for the molded body may be higher than the heat treatment temperature ($T_1$) before obtaining the molded body.

In an embodiment, prior to the heat-treating the molded body, the molded body may be pressed into pellets. As described above, when the heat treatment is performed on the form of pellets, the diffusion distance of the material to be heat treated is shortened, so that the target oxide may be easily produced.

The heat treatment of the molded body may be performed under, for example, an oxidizing gas atmosphere, a reducing gas atmosphere, or an inert gas atmosphere. The oxidizing gas atmosphere may be formed using, for example, air or oxygen, and the reducing gas atmosphere may be formed using a reducing gas such as hydrogen and an inert gas atmosphere such as nitrogen, argon, or helium.

The heat treatment time for the molded body varies depending on the heat treatment temperature for the molded body, and may be in the range of about 1 hour to about 50 hours, and for example, about 6 hours to about 48 hours.

According to an aspect of an embodiment, an electrochemical device includes the oxide. The electrochemical device may be, for example, an electrochemical cell, a storage cell, a supercapacitor, a fuel cell, a sensor, or a color change device.

Figure 10:
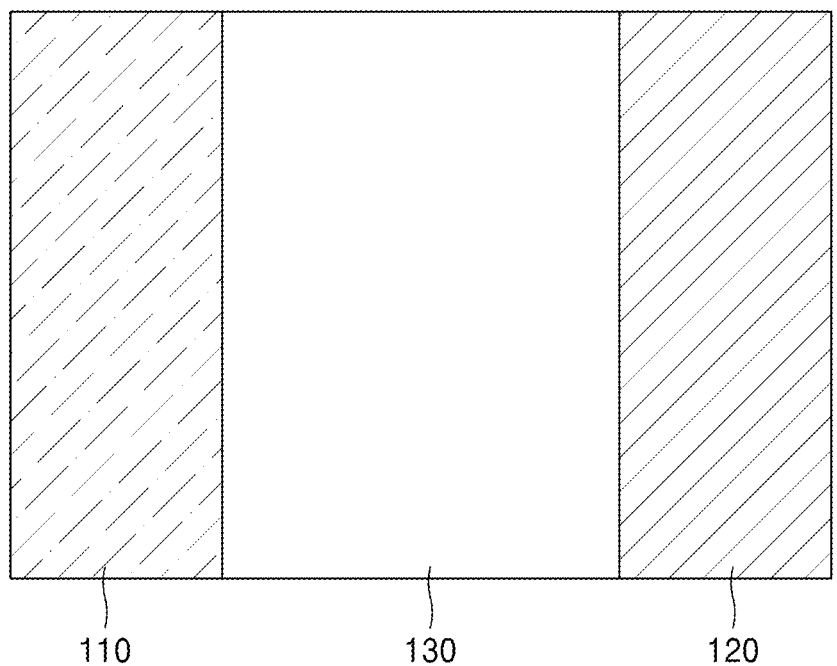
FIG. 10 schematically shows an embodiment of the structure of an electrochemical device.

FIG. 10 is a cross-sectional view of an embodiment of an electrochemical device 100.

Referring to FIG. 10, the electrochemical device 100 may include a first electrode 110, a second electrode 120 and a solid electrolyte layer 130 disposed between the first electrode and the second electrode.

The first and second electrodes 110 and 120 may each include an electrically conductive material. The solid electrolyte layer 130 may include an oxide according to an embodiment. This solid electrolyte layer 130 may have conductivity with respect to lithium ($Li^+$).

The electrochemical device may be any device that requires an electrolyte layer having conductivity with respect to lithium ions ($Li^+$). For example, the electrochemical device 100 may be a lithium ion battery, a lithium metal battery, a lithium-air battery, a lithium-based redox-flow battery, a Li $H_2O_2$ semi-fuel cell, or a chemical sensor.

An electrochemical cell may be an all-solid secondary battery, lithium air battery, lithium ion battery, or lithium-based redox-flow battery. Fuel cells may be, for example, proton exchange membrane fuel cells or Li—$H_2O_2$ semi-fuel cells.

The electrochemical cell does not comprise an organic electrolyte.

According to another aspect, provided is an electrochemical cell containing a positive electrode, a negative electrode, and a solid electrolyte containing an oxide according to an embodiment therebetween. The electrochemical cell may include a positive electrode, a negative electrode containing lithium, and a solid electrolyte containing an oxide according to an embodiment located between the positive electrode and the negative electrode.

The electrochemical cell may be a lithium secondary battery, a lithium air battery, or an all-solid battery. The electrochemical cell may be used for both primary and secondary batteries. The shape of the electrochemical cell is not particularly limited, and may be of, for example, a coin type, a button type, a sheet type, a stacked type, a cylindrical type, a flat type, or a horn type. The electrochemical cell according to an embodiment may also be applied to provide a battery comprising a plurality of cells connected in any suitable combination of series and parallel connections to provide a medium or large battery for an electric vehicle.

The electrochemical cell may be, for example, an all-solid-state cell using a precipitation-type negative electrode. The precipitation-type negative electrode refers to a negative electrode in which a negative electrode material, such as lithium metal, is deposited after an electrochemical battery is charged, and may comprise a negative electrode coating layer that is free of a negative active material when the electrochemical cell is assembled.

The solid electrolyte may be an electrolyte protective film, a positive electrode protective film, a negative electrode protective film or a combination thereof.

A solid electrolyte according to an embodiment may be used as a positive electrode protective film in a battery using a sulfide-based solid electrolyte, and may effectively reduce the reaction between a sulfide-based solid electrolyte and a positive electrode. In addition, the solid electrolyte according to an embodiment may be formed using a positive electrode coating material and thus used as a positive electrode protective film. The solid electrolyte according to an embodiment has a high oxidation potential and thus, may be used as a positive electrode electrolyte, for example, a positive electrode electrolyte for an all-solid secondary battery.

In an embodiment, the electrochemical battery may be an all-solid battery.

Figure 6:
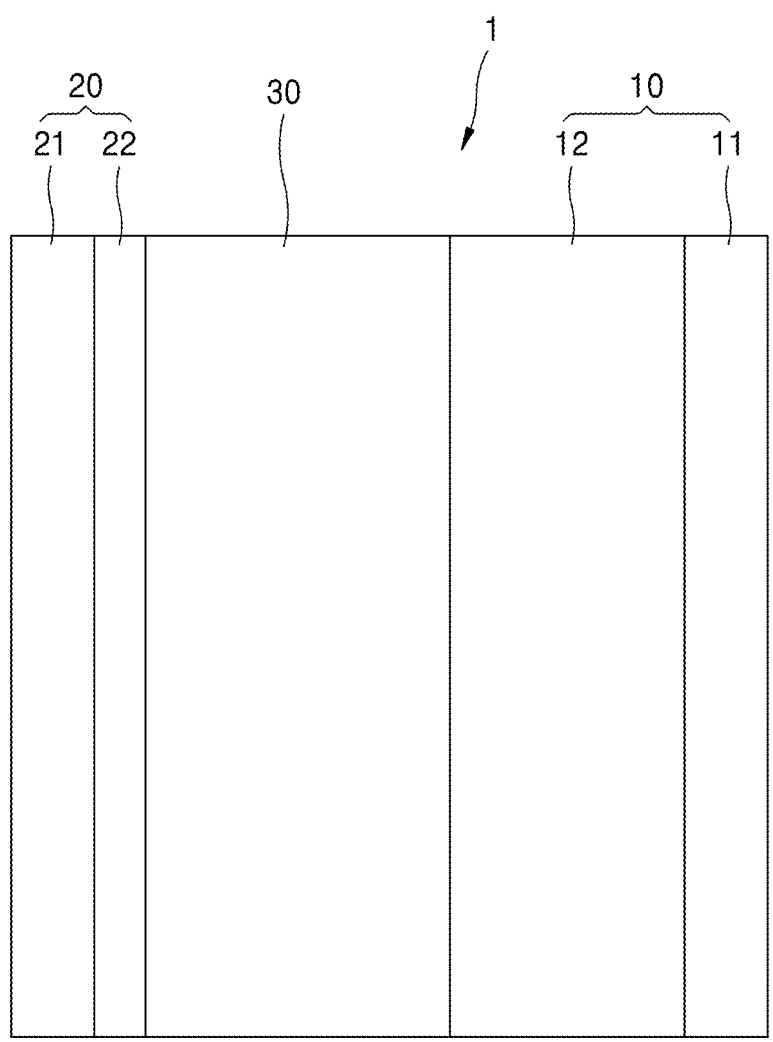
FIGS. 6 to 8 are each a cross-sectional view showing an embodiment of a schematic configuration of an all-solid battery.

Referring to FIG. 6, a configuration of an all-solid secondary battery 1 according to an embodiment will be further described. The all-solid-state battery 1 may include, as illustrated in FIG. 6, a positive electrode layer 10, a negative electrode layer 20, and a solid electrolyte layer 30. The positive electrode layer 10 and/or the solid electrolyte layer 30 may include an oxide according to an embodiment.

The positive electrode layer 10 may include a positive electrode current collector 11 and a positive active material layer 12. The positive electrode current collector 11 may include, for example, a plate or foil consisting of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The positive electrode current collector 11 may be omitted.

The positive active material layer 12 may contain a positive active material, a binder, and a solid electrolyte. In an embodiment, the solid electrolyte contained in the positive electrode layer 10 may be similar to or different from the solid electrolyte contained in the solid electrolyte 30.

Positive Electrode Layer: Positive Electrode Current Collector

The positive electrode current collector 11 includes, for example, a plate or foil consisting of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The positive electrode current collector 11 may be omitted. In addition, a carbon layer having a thickness of about 0.1 μm to about 4 μm may be located on a positive electrode current collector to increase the bonding force between a positive electrode current collector and a positive electrode layer.

Positive Electrode Layer: Positive Active Material

The positive active material layer 12 contains a positive active material, a solid electrolyte, and a binder. The solid electrolyte may be for example, the compound of Formula 1, and/or the compound of Formula 2.

The positive active material layer 12 may include a conductive material. The conductive material may be, for example, at least one of graphite, carbon black, acetylene black, carbon nanofiber, or carbon nanotube.

The solid electrolyte contained in positive electrode layer 10 may be similar to or different from the solid electrolyte contained in solid electrolyte layer 30. The solid electrolyte may be the same as described in connection with the solid electrolyte layer 30.

A positive active material may be a positive active material that may reversibly absorb and desorb lithium ions. The positive active material may be, for example, a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, or lithium iron phosphate; or nickel sulfide, copper sulfide, lithium sulfide, iron oxide, or vanadium oxide, and is not limited thereto. The positive active material may be any suitable positive active material that is used as a positive active material in the related art. A positive active material may be a single material or a mixture of two or more materials.

The positive active material may be, for example, $Li_aA_{1-b}B'_bD_2$ (wherein $0.90 \leq a \leq 1$, and $0 \leq b \leq 0.5$); $Li_aE_{1-b}B'_bO_{2-c}D_c$ (wherein $0.90 \leq a \leq 1$, $0 \leq b \leq 0.5$, $0 \leq c \leq 0.05$); $LiE_{2-b}B'_bO_{4-c}D_c$ (wherein $0 \leq b \leq 0.5$, $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, $0 \leq \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, $0 < \alpha < 2$); $i_aNi_bE_cG_dO_2$ (wherein $0.90 \leq a \leq 1$, $0 \leq b \leq 0.9$, $0 \leq c \leq 0.5$, $0.001 \leq d \leq 0.1$); $Li_aNi_bCo_cMn_d GeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.9 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$, $0.001 \leq b \leq 0.1$); $Li_aMn_2G_bO_4$ (where $0.90 \leq a \leq 1$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$, or a combination thereof. In these compounds, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. A compound having a coating layer added on the surface of such a compound, and a mixture of the above-described compound and a compound having a coating layer added thereto may be used. The coating layer added to the surface of such a compound may include, for example, a coating element compound of oxide, hydroxide, oxyhydroxide, or oxycarbonate, or hydroxycarbonate of a coating element. The compound constituting the coating layer may be amorphous or crystalline. Examples of the coating element included in the coating layer are Mg, Al, Co, K, Na, Ca, Si, Ti, V, Sn, Ge, Ga, B, As, Zr, or a mixture thereof. A method of forming the coating layer may be selected within such a range that does not adversely affect the physical properties of the positive active material. The coating method may be, for example, spray coating, or a dipping method. A detailed description of the coating method will be omitted because the details of the coating method may be determined by one of skill in the art without undue experimentation.

The positive active material for example includes a lithium salt of a transition metal oxide having a layered rock salt type structure among the lithium transition metal oxides described above. The term "layered rock salt type structure" used herein refers to, for example, a structure in which oxygen atomic layers and metal atomic layers are alternately arranged regularly in the <111> direction of the cubic rock salt type structure, whereby each atomic layer forms a two-dimensional plane. The "cubic rock salt type structure" refers to a NaCl type structure, which is a kind of crystal structure, and specifically, a structure in which a face centered cubic lattice (fcc), forming each of a cation and an anion, is shifted by ½ of the ridge of a unit lattice. Lithium transition metal oxide having such a layered rock salt type structure may be, for example, a ternary lithium transition metal oxide such as $LiNi_xCo_yAl_zO_2$ (NCA) or $LiNi_xCo_yMn_zO_2$ (NCM) ($0<x<1, 0<y<1, 0<z<1, x+y+z=1$). When the positive active material contains a ternary lithium transition metal oxide having a layered rock salt type structure, the energy density and thermal stability of the all-solid secondary battery 1 may be further improved.

The positive active material may be covered by a coating layer as described above. The coating layer may be any suitable coating layer of a positive active material for an all-solid secondary battery. The coating layer may be, for example, $Li_2O$—$ZrO_2$ (LZO).

When the positive active material is a ternary lithium transition metal oxide including nickel (Ni), for example, NCA or NCM, the capacity density of the all-solid secondary battery 1 is increased, thereby reducing the metal elution of the positive active material. As a result, the cycle characteristics of the all-solid secondary battery 1 in the charged state are improved.

The positive active material may be in the form of particles, for example, spherical or elliptical particles. The particle diameter of the positive active material is not particularly limited, and is within a range applicable to the positive active material of an all-solid secondary battery of the related art. The amount of the positive active material of the positive electrode 10 is not particularly limited, and is within a range applicable to the positive electrode of an all-solid secondary battery of the related art.

Positive Electrode Layer: Solid Electrolyte

A positive active material layer 12 may contain, for example, solid electrolyte. The solid electrolyte contained in positive electrode layer 10 may be the same as or different from the solid electrolyte contained in the solid electrolyte layer 30. The solid electrolyte may be the same as described in connection with the solid electrolyte layer 30.

The solid electrolyte contained in the positive active material layer 12 may have a smaller D50 average particle diameter than the solid electrolyte contained in the solid electrolyte layer 30. For example, the D50 average particle diameter of the solid electrolyte contained in the positive active material layer 12 may be about 90% or less, about 80% or less, about 70% or less, about 60% or less, about 50% or less, about 40% or less, about 30% or less, or about 20% or less of the D50 average particle diameter of the solid electrolyte contained in the solid electrolyte layer 30.

Positive Electrode Layer: Binder

The positive active material layer 12 may contain a binder. The binder may be, for example, polyvinylidene fluoride, styrene butadiene rubber (SBR), polytetrafluoroethylene, vinylidene fluoride/hexafluoropropylene copolymer, polyacrylonitrile, or polymethylmethacrylate.

Positive Electrode Layer: Conductive Material

The positive active material layer 12 may include a conductive material. The conductive material may be, for example, graphite, carbon black, acetylene black, Ketjen black, carbon fiber, or a metal powder.

Positive Electrode Layer: Other Additives

The positive electrode layer 10 may include an oxide according to an embodiment as a positive electrode electrolyte. The positive electrode layer 10 may further include, in addition to the positive active material, the solid electrolyte, the binder, or the conductive material, which are described above, additives such as a filler, a coating agent, a dispersant, or an ion conductive auxiliary agent.

A filler, a coating agent, a dispersant, or an ion conductive auxiliary agent, which may be included in the positive electrode layer 10, may be any suitable materials that are used for an electrode for an all-solid secondary battery.

Solid Electrolyte Layer

The solid electrolyte contained in solid electrolyte layer 30 may contain an oxide-based solid electrolyte according to an embodiment. The solid electrolyte may further contain a sulfide-based solid electrolyte.

The solid electrolyte may further comprise, for example, a solid electrolyte material based on a sulfide. The sulfide-based solid electrolyte material may be, for example, $Li_2S$—$P_2S_5$, $Li_2S$—$P_2S_5$—LiX (X is a halogen element, such as I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n are each a positive number and Z is one of Ge, Zn, and Ga), $Li_2S$—$GeS_2$, $Li_2S$—$SiS_2$—$Li_3PO_4$, or $Li_2S$—$SiS_2$—$Li_pMO_q$ (p and q may each be a positive number and M may be one of P, Si, Ge, B, Al, Ga, and In). Here, the sulfide-based solid electrolyte material may be produced by processing a starting material (for example, $Li_2S$ and $P_2S_5$) by a melt quenching method or a mechanical milling method. Further, after such treatment, the heat treatment may be performed. The solid electrolyte may be amorphous, crystalline, or a mixture thereof.

In an embodiment, as a solid electrolyte, from among the sulfide-based solid electrolyte materials described above, a sulfide-based solid electrolyte material including at least sulfur (S), phosphorus (P), and lithium (Li) as constituent elements may be used. In an embodiment, a material including $Li_2S$—$P_2S_5$ may be used. Here, in the case where $Li_2S$—$P_2S_5$ is used as a sulfide-based solid electrolyte material to form a solid electrolyte, the mixed molar ratio of $Li_2S$ and $P_2S_5$ may be, for example, $Li_2S:P_2S_5$=50:50 to 90:10. In addition, the solid electrolyte layer 30 may further contain a binder. The binder contained in the solid electrolyte layer 30 may be, for example, styrene butadiene rubber (SBR), polytetrafluoroethylene, polyvinylidene fluoride, or polyethylene. The binder of the solid electrolyte layer 30 may be the same or different from the binder of the positive active material layer 12 and a negative active material layer 22. The negative active material layer may be omitted, for example, in a precipitation-type negative electrode.

The sulfide-based solid electrolyte may be, for example, an argyrodite-type compound including at least one of $Li_{7-x}PS_{6-x}Cl_x$, $0≤x≤2$, $Li_{7-x}PS_{6-x}Br_x$, $0≤x≤2$, or $Li_{7-x}PS_{6-x}I_x$, $0≤x≤2$. In particular, the sulfide-based solid electrolyte may be an argyrodite-type compound containing at least one of $Li_6PS_5Cl$, $Li_6PS_5Br$, or $Li_6PS_5I$.

Solid Electrolyte Layer: Binder

The solid electrolyte layer 30 may contain, for example, a binder. The binder included in the solid electrolyte layer 30 may be, for example, styrene butadiene rubber (SBR), polytetrafluoroethylene, polyvinylidene fluoride, or polyethylene, but is not limited thereto, and any suitable binder used in the art may be used therefor. The binder of the solid electrolyte layer 30 may be the same as or different from the binder included in each of the positive active material layer 12 and the negative active material layer 22. The negative active material layer 22 may be, for example, a first negative active material layer 22.

Negative Electrode Layer

Negative Electrode Layer: Negative Active Material

The negative electrode layer 20 includes a negative electrode current collector 21 and the first negative active material layer 22 located on the negative electrode current collector 21. The first negative active material layer 22 may include, for example, a negative active material and a binder.

The negative active material included in the first negative active material layer 22 may be, for example, in the form of particles. The negative active material in the form of particles has an average particle diameter of, for example, about 4 μm or less, about 2 μm or less, about 1 μm or less, or about 900 nm or less. The negative active material in the form of particles has an average particle diameter of, for example, about 10 nm to about 4 μm, about 10 nm to about 2 μm, or about 10 nm to about 900 nm. As the negative active material has an average particle diameter within these ranges, this may further facilitate reversible intercalation and/or deintercalation of lithium during charge and discharge. The average particle diameter of the negative active material is, for example, a median diameter (D50) measured using a laser particle size distribution analyzer.

The negative active material may include, for example, at least one of a carbon-based negative active material or a metal or metalloid negative active material.

In particular, the carbon-based negative active material may be amorphous carbon. The amorphous carbon may be, for example, carbon black (CB), acetylene black (AB), furnace black (FB), ketjen black (KB), or graphene, but is not necessarily limited thereto, and may be any suitable material classified as amorphous carbon in the art. The amorphous carbon, which is carbon having no or very low crystallinity, is distinguished from crystalline carbon or graphitic carbon.

The metal or metalloid negative active material includes at least one of gold (Au), platinum (Pt), palladium (Pd), silicon (Si), silver (Ag), aluminum (Al), bismuth (Bi), tin (Sn), or zinc (Zn), but not necessarily limited thereto, and may be any suitable material used as a metal negative active material or metalloid negative active material that forms an alloy or compound with lithium in the art. For example, since nickel (Ni) does not form an alloy with lithium, nickel is not a metal negative active material.

The first negative active material layer 22 includes a negative active material selected from these negative active materials, or a mixture of a plurality of different negative active materials. For example, the first negative active material layer 22 includes amorphous carbon alone, or at least one of gold (Au), platinum (Pt), palladium (Pd), silicon (Si), silver (Ag), aluminum (Al), bismuth (Bi), tin (Sn), or zinc (Zn). Unlike this, the first negative active material layer 22 includes a mixture of amorphous carbon and at least one of gold (Au), platinum (Pt), palladium (Pd), silicon (Si), silver (Ag), aluminum (Al), bismuth (Bi), tin (Sn), or zinc (Zn). A mixed ratio of amorphous carbon and, for example, gold, may be, by weight ratio, for example, 10:1 to 1:2, 5:1 to 1:1, or 4:1 to 2:1, but not necessarily limited thereto, and may be selected according to desired characteristics of the all-solid secondary battery 1. As the negative active material has such a composition, the all-solid secondary battery 1 has further improved cycle characteristics.

The negative active material included in the first negative active material layer 22 may include, for example, a mixture of first particles consisting of amorphous carbon and second particles consisting of a metal or metalloid. The metal or metalloid includes, for example, gold (Au), platinum (Pt), palladium (Pd), silicon (Si), silver (Ag), aluminum (Al), bismuth (Bi), tin (Sn), or zinc (Zn). In other embodiments, the metalloid is a semiconductor. The amount of the second particles may be about 8 wt % to about 60 wt %, about 10 wt % to about 50 wt %, about 15 wt % to about 40 wt %, or about 20 wt % to 30 wt % with respect to a total weight of the mixture. As the amount of the second particles is within these ranges, for example, the all-solid secondary battery 1 has further improved cycle characteristics.

The negative active material included in the first negative active material layer 22 may be a metal layer containing lithium or a lithium alloy. The metal layer includes lithium or a lithium alloy. Therefore, since the first negative active material layer is a metal layer containing lithium, the first negative active material layer acts as a lithium reservoir. The lithium alloy may be, for example, a Li—Al alloy, a Li—Sn alloy, a Li—In alloy, a Li—Ag alloy, a Li—Au alloy, a Li—Zn alloy, a Li—Ge alloy, or a Li—Si alloy, but is not limited thereto, and may be any suitable lithium alloy that is used in the art. The first negative active material layer may comprise or consist of one of these alloys or lithium, or may comprise or consist of different alloys.

Negative Electrode Layer: Binder

The binder included in the first negative active material layer 22 may be, for example, styrene butadiene rubber (SBR), polytetrafluoroethylene, polyvinylidene fluoride, polyethylene, vinylidene fluoride/hexafluoropropylene copolymer, polyacrylonitrile, or polymethyl methacrylate. However, the binder is not limited thereto, and any suitable material that is used as a binder in the art may be used. The binder may include one binder alone or a plurality of different binders.

By the inclusion of a binder in the first negative active material layer 22, the first negative active material layer 22 is stabilized on the negative electrode current collector 21. In addition, despite a change in volume and/or relative position of the first negative active material layer 22 during charge and discharge, cracking of the first negative active material layer 22 is suppressed. For example, in a case where the first negative active material layer 22 does not include a binder, the first negative active material layer 22 may be easily separated from the negative current collector 21. At a portion of the negative electrode current collector 21 exposed due to the release of the first negative active material layer 22 from the negative electrode current collector 21, due to the contact between the negative electrode current collector 21 and a solid electrolyte layer, it is highly likely for the short circuit to occur. The first negative active material layer 22 is formed by, for example, coating, on the negative electrode current collector 21, a slurry in which materials constituting the first negative active material layer 22 are dispersed, and drying the slurry. By inclusion of a binder in the first negative active material layer 22, stable dispersion of negative active material in the slurry is possible. For example, in a case where the slurry is coated on the negative electrode current collector 21 by screen printing, it is possible to suppress clogging of the screen (for example, clogging caused by aggregates of the negative active material).

Negative Electrode Layer: Other Additives

The first negative active material layer 22 may further include an additive used in the all-solid secondary battery 1 of the related art, for example, a filler, a coating agent, a dispersant, or an ion conductive auxiliary agent.

Structure of the Negative Electrode Layer

The thickness of the first negative active material layer 22 may be, for example, about 50% or less, about 40% or less, about 30% or less, about 20% or less, about 10% or less, or about 5% or less of the thickness of a positive active material layer. The thickness of the first negative active material layer may be, for example, about 1 μm to about 20 μm, about 2 μm to about 10 μm, or about 3 μm to about 7 μm. When the thickness of the first negative active material layer is too small, the lithium dendrite formed between the first negative active material layer 22 and the negative electrode current collector 21 collapses the first negative active material layer. Thus, it is difficult to improve the cyclic characteristics of the all-solid secondary battery 1. When the thickness of the first negative active material layer 22 is excessively increased, the energy density of the all-solid secondary battery 1 decreases and the internal resistance of the all-solid secondary battery 1 by the first negative active material layer is increased. Thus, it is difficult to improve the cyclic characteristics of the all-solid secondary battery 1.

As the thickness of the first negative active material layer 22 decreases, the charging capacity of the first negative active material layer 22 also decreases. The charge capacity of the first negative active material layer 22 may be, for example, about 50% or less, about 40% or less, about 30% or less, about 20% or less, about 10% or less, about 5% or less, or about 2% or less of the charge capacity of the positive active material layer 12. The charging capacity of the first negative active material layer 22 may be from about 0.1% to about 50%, from about 0.1% to about 30%, from about 0.1% to about 10%, from about 0.1% to about 5%, or from about 0.1% to about 2% of the charge capacity of the positive active material layer 12. When the charging capacity of the first negative active material layer 22 is too small, the thickness of the first negative active material layer 22 becomes very small, so that a lithium dendrite formed between the first negative active material layer 22 and the negative electrode current collector 21 may collapse the first negative active material layer 22, and thus, it is difficult to improve the cyclic characteristics of the all-solid secondary battery 1. When the charging capacity of the first negative active material layer 22 is excessively increased, the energy density of the all-solid secondary battery 1 decreases and the internal resistance of the all-solid secondary battery 1 by the first negative active material layer 22 is increased. Thus, it is difficult to improve the cyclic characteristics of the all-solid secondary battery 1.

The charge capacity of the positive active material layer 12 is obtained by multiplying the specific capacity (mAh/g) of the positive active material determined on charge (oxidation) by the mass of the positive active material in the positive active material layer 12. When several types of positive active material are used, the specific capacity is multiplied by mass, for each positive active material, and the sum of the obtained values is the charging capacity of the positive active material layer 12. The charging capacity of the first negative active material layer 22 is also calculated in the same manner. That is, the specific capacity of the first negative active material layer 22 is obtained by multiplying the specific capacity (mAh/g) of the negative active material by the mass of the negative active material in the first negative active material layer 22. When several types of negative active material are used, the charging capacity is multiplied by the mass for each negative active material, and the sum of the obtained values is the charging capacity of the first negative active material layer 22. Here, the charging capacity of the positive active material and the negative active material is the estimated capacity obtained using an all-solid half-cell using lithium metal as a counter electrode. By measuring the charging capacity using an all-solid half-cell, the charging capacity of each of the positive active material layer 12 and the first negative active material layer 22 is directly measured. When the measured charging capacity is divided by the mass of each active material, the specific capacity is obtained. Alternatively, the charging capacity of each of the positive active material layer 12 and the first negative active material layer 22 may be the initial charging capacity measured during charging in the first cycle.

A carbon layer may be further included between a negative active material and a solid electrolyte layer.

Negative Electrode Layer: Negative Electrode Current Collector

For example, the negative electrode current collector 21 comprises or consists of materials that do not react with lithium, that is, materials that form neither an alloy nor a compound with lithium. Materials constituting the negative electrode current collector 21 are, for example, copper (Cu), stainless steel, titanium (Ti), iron (Fe), cobalt (Co), or nickel (Ni), but are not necessarily limited thereto. Any suitable materials that are used for an electrode current collector in the art are possible. The thickness of the negative electrode current collector may be from about 1 μm to about 20 μm, from about 5 μm to about 15 μm, or from about 7 μm to about 10 μm.

The negative electrode current collector 21 may comprise or consist of one of the above-described metals, or may comprise or consist of an alloy or coating material of two or more metals thereof. The negative electrode current collector 21 may be, for example, in the form of a plate or foil.

Figure 7:
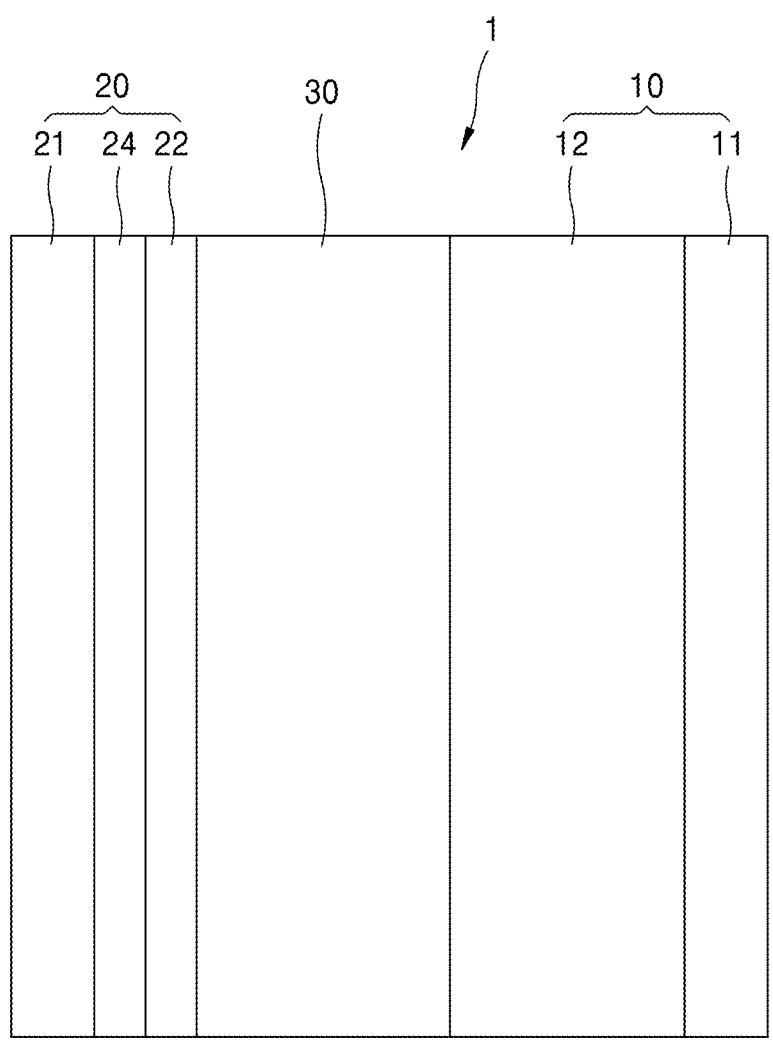

Referring to FIG. 7, for example, the all-solid secondary battery 1 may further include, on the negative electrode current collector 21, a thin film 24 including an element capable of forming an alloy with lithium. The thin film 24 may be placed between the negative electrode current collector 21 and the first negative active material layer 22. The thin film 24 includes, for example, an element capable of forming an alloy with lithium. The element capable of forming an alloy with lithium is, for example, gold, silver, zinc, tin, indium, silicon, aluminum, or bismuth, but is not necessarily limited thereto, and can be any suitable element known in the art capable of forming an alloy with lithium. The thin film 24 may consist of one of these metals, or an alloy of different metals. As the thin film 24 is located on the negative electrode current collector 21, for example, a second negative active material layer (not shown) deposited between the thin film 24 and the first negative active material layer 22 is further planarized, and the all-solid secondary battery 1 may have further improved cyclic characteristics.

The thin film 24 may have a thickness of, for example, from about 1 nm to about 800 nm, from about 10 nm to about 700 nm, from about 50 nm to about 600 nm, or from about 100 nm to about 500 nm. When the thickness of the thin film 24 is less than 1 nm, it may be difficult to exhibit the function of the thin film 24. When the thickness of the thin film 24 is too great, the thin film 24 may absorb lithium and the amount of lithium precipitated in the negative electrode layer 20 is decreased, reducing the energy density of the all-solid secondary battery 1, and the cyclic characteristics of the all-solid secondary battery 1. The thin film 24 may be located on the negative electrode current collector 21 by, for example, a vacuum deposition method, a sputtering method, or a plating method, but not necessarily limited to these methods, and any method known in the art capable of forming the thin film 24 is possible.

Negative Electrode Layer: Precipitation Layer

Figure 8:
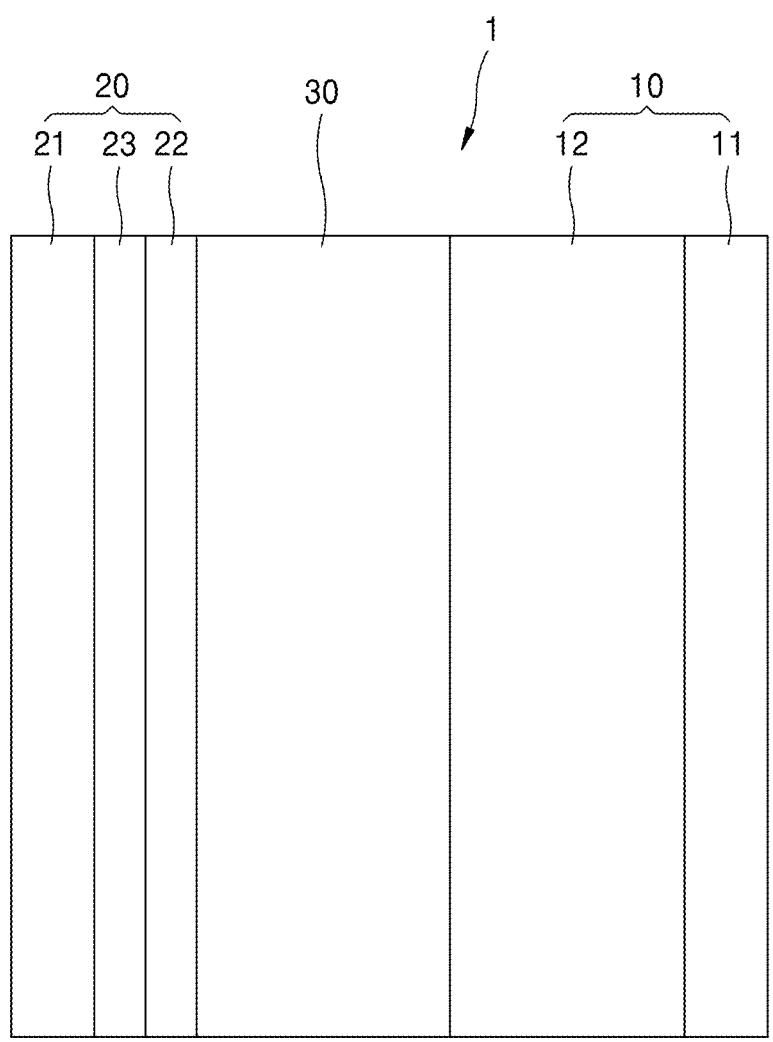

Referring to FIG. 8, the all-solid secondary battery 1 may further include, for example, a second negative active material layer 23 which is located between the negative electrode current collector 21 and the first negative active material layer 22 by charging. Although not illustrated in the drawing, the all-solid secondary battery 1 may further include the second negative active material layer 23 located between the solid electrolyte layer 30 and the first negative active material layer 22 by charging, or the all-solid secondary battery 1 may include the second negative active material layer 23 alone. The second negative active material layer 23 is a metal layer containing lithium or a lithium alloy. The metal layer includes lithium or a lithium alloy. Accordingly, since the second negative active material layer 23 is a metal layer containing lithium, the second negative active material layer 23 may act as, for example, a lithium reservoir. The lithium alloy is, for example, a Li—Al alloy, a Li—Sn alloy, a Li—In alloy, a Li—Ag alloy, a Li—Au alloy, a Li—Zn alloy, a Li—Ge alloy, or a Li—Si alloy, but is not limited thereto, and may be any suitable lithium alloy used in the art. The second negative active material layer 23 may comprise or consist of one of these alloys or lithium, or may comprise or consist of different alloys.

The second negative active material layer 23 has a thickness of, for example, but not specifically limited to, about 1 μm to about 1,000 μm, about 1 μm to about 500 μm, about 1 μm to about 200 μm, about 1 μm to about 150 μm, about 1 μm to about 100 μm, or about 1 μm to about 50 μm. When the thickness of the second negative active material layer 23 is too small, the second negative active material layer 23 may not act as a lithium reservoir. When the second negative active material layer 23 is too thick, there is a possibility that the mass and volume of the all-solid secondary battery 1 increases, and the cyclic characteristics thereof are deteriorated. The second negative active material layer 23 may be, for example, a metal foil having a thickness within these ranges.

In the all-solid secondary battery 1, for example, the second negative active material layer 23 may be disposed between the negative electrode current collector 21 and the first negative active material layer 22 before assembly of the all-solid secondary battery 1, or may be deposited between the negative electrode current collector 21 and the first negative active material layer 22 by charging, after assembly of the all-solid secondary battery 1.

In a case where the second negative active material layer 23 is disposed between the negative electrode current collector 21 and the first negative active material layer 22 before assembly of the all-solid secondary battery 1, the second negative active material layer 23, which is a metal layer including lithium, acts as a lithium reservoir. The all-solid secondary battery 1 including the second negative active material layer 23 has further improved cyclic characteristics. For example, before assembly of the all-solid secondary battery 1, a lithium foil may be disposed between the negative electrode current collector 21 and the first negative active material layer 22.

In a case where the second negative active material layer 23 is formed by charging after assembly of the all-solid secondary battery 1, the all-solid secondary battery 1 may have increased energy density, as the all-solid secondary battery 1 does not include the second negative active material layer 23 during assembly. For example, in charging the all-solid secondary battery 1, the all-solid secondary battery 1 is charged to exceed the charge capacity of the first negative active material layer 22. That is, the first negative active material layer 22 is overcharged. At the beginning of charging, lithium is adsorbed in the first negative active material layer 22. That is, the negative active material included in the first negative active material layer 22 forms an alloy or compound with lithium ions transferred from the positive electrode layer 10.

When charging is performed to exceed the capacity of the first negative active material layer 22, for example, lithium precipitates on the rear surface of the first negative active material layer 22, that is, between the negative electrode current collector 21 and the first negative active material layer 22, and due to the precipitated lithium, a metal layer corresponding to the second negative active material layer 23 is formed. The second negative active material layer 23 is a metal layer mainly including lithium (that is, metallic lithium). This result is obtained when the negative active material included in the first negative active material layer 22 includes a material that forms an alloy or compound with lithium. During discharging, lithium in the first negative active material layer 22 and the second negative active material layer 23, that is, metal layers, is ionized and migrates toward the positive electrode layer 10. Accordingly, in the all-solid secondary battery 1, it is possible to use lithium as the negative active material.

In addition, since the first negative active material layer 22 covers the second negative active material layer 23, the first negative active material layer 22 acts as a protective layer for the second negative active material layer 23, that is, a metal layer, and inhibits the precipitation growth of lithium dendrites. Accordingly, a short circuit and capacity reduction in the all-solid secondary battery 1 are suppressed, and as a result, the all-solid secondary battery 1 has improved cyclic characteristics. In addition, in a case where the second negative active material layer 23 is formed by charging after the all-solid secondary battery 1 is assembled, the negative electrode current collector 21, the first negative active material layer 22, and a region therebetween are, for example, Li-free regions that do not contain lithium (Li) in the initial state or after discharge of the all-solid secondary battery.

It will be described in more detail through the following Examples and Comparative Examples. However, Examples are for illustrative purposes only, and the scope of the disclosure is not limited thereto.

EXAMPLES

Example 1

LiOH as a lithium precursor, $Ta_2O_5$ as a tantalum precursor, $(NH_4)_2HPO_4$ as a phosphorus precursor, and $Li_2B_4O_7$ as a boron precursor were mixed in a stoichiometric ratio according to the composition ratio shown in Table 1. Acetone was added thereto, and pulverizing and mixing were performed thereon for 2 hours by using a planetary mill including zirconia balls, thereby obtaining a precursor mixture. The amount of acetone is about 100 parts by weight based on 100 parts by weight of the total weight of the precursors. When the precursor mixture was prepared, LiOH was used in an excess of about 10 wt % to compensate for loss in the subsequent heat treatment process of the precursor mixture in advance.

The precursor mixture was heated to 600° C. at a heating rate of about 5° C./min, and at this temperature, the first heat treatment was performed in an air atmosphere for 8 hours.

After this process, the first heat-treated powder was subjected to planetary milling for 10 minutes.

The resultant was heated to 1000° C. at a heating rate of about 5° C./min, and at this temperature, secondary heat treatment was performed for 8 hours in an air atmosphere to obtain oxide powder having the composition shown in Table 1.

Example 2, Example 3, Example 5, and Examples 16-18

Oxide powder was obtained in the same manner as in Example 1, except that, in preparing the precursor mixture, the amount of the boron precursor $Li_2B_4O_7$ was changed to obtain the oxide powder having the compositions in Table 1.

Example 4, Example 6, Example 7, and Example 19

Oxide powder was obtained in the same manner as in Example 1, except that, in preparing the precursor mixture, $Sb_2O_3$ as an antimony precursor was used instead of $Li_2B_4O_7$ as a boron precursor, and the amount thereof was controlled in a stoichiometric ratio to obtain oxide powder having the compositions shown in Table 1.

Examples 8-10

Oxide powder was obtained in the same manner as in Example 1, except that, in preparing the precursor mixture, $In_2O_3$ as an indium precursor was used instead of $Li_2B_4O_7$ as a boron precursor, and the amount thereof was controlled in a stoichiometric ratio to obtain oxide powder having the compositions shown in Table 1.

Examples 11-13

Oxide powder was obtained in the same manner as in Example 1, except that, in preparing the precursor mixture, $Ga_2O_3$ as a gallium precursor was used instead of $Li_2B_4O_7$ as a boron precursor, and the amount thereof was controlled in a stoichiometric ratio to obtain oxide powder having the compositions shown in Table 1.

Examples 14-15

Oxide powder was obtained in the same manner as in Example 1, except that, in preparing the precursor mixture, lithium chloride (LiCl) was further added and the amount of each precursor was controlled in a stoichiometric ratio to obtain oxide powder having the compositions shown in Table 1.

Examples 20-21

Except that the composition of the precursor mixture was changed to obtain an oxide powder having the composition shown in Table 1 below, an oxide powder was obtained in the same manner as in Example 1. In Example 20, vanadium oxide and antimony oxide were used as a vanadium precursor and an antimony precursor, respectively, and indium oxide was used as an indium precursor in Example 21.

Comparative Example 1

Oxide powder was obtained in the same manner as in Example 1, except that LiOH as a lithium precursor, $Ta_2O_5$ as a tantalum precursor, and $(NH_4)_2HPO_4$ as a phosphorus precursor were used as a precursor. The amounts of the lithium precursor, the tantalum precursor and the phosphorus precursor were controlled to obtain oxides having the compositions shown in Table 1.

Comparative Example 2

Oxide powder was obtained in the same manner as in Comparative Example 1, except that $Al_2O_3$, which is an aluminum precursor, was additionally used, and the amount of each precursor was controlled to obtain an oxide having the composition of Table 1.

Comparative Example 3

Oxide powder was obtained in the same manner as in Comparative Example 2, except that $La_2O_3$, which is a lanthanum precursor, was additionally used, and the amount of each precursor was controlled to obtain an oxide having the composition of Table 1.

TABLE 1

| Example | Composition |
|---|---|
| Example 1 | $Li_{1.2}Ta_2P_{0.9}B_{0.1}O_8$ |
| Example 2 | $Li_{1.4}Ta_2P_{0.8}B_{0.2}O_8$ |
| Example 3 | $Li_{1.6}Ta_2P_{0.7}B_{0.3}O_8$ |
| Example 4 | $Li_{1.2}Ta_2P_{0.9}Sb_{0.1}O_8$ |
| Example 5 | $Li_{1.8}Ta_2P_{0.6}B_{0.4}O_8$ |
| Example 6 | $Li_{1.4}Ta_2P_{0.8}Sb_{0.2}O_8$ |
| Example 7 | $Li_{1.6}Ta_2P_{0.7}Sb_{0.3}O_8$ |
| Example 8 | $Li_{1.2}T_a2P_{0.9}In_{0.1}O_8$ |
| Example 9 | $Li_{1.4}Ta_2P_{0.8}In_{0.2}O_8$ |
| Example 10 | $Li_{1.6}Ta_2P_{0.7}In_{0.3}O_8$ |
| Example 11 | $Li_{1.2}Ta_2P_{0.9}Ga_{0.1}O_8$ |
| Example 12 | $Li_{1.4}Ta_2P_{0.8}Ga_{0.2}O_8$ |
| Example 13 | $Li_{1.6}Ta_2P_{0.7}Ga_{0.3}O_8$ |
| Example 14 | $Li_{1.1}Ta_2P_{0.9}B_{0.1}O_{7.9}Cl_{0.1}$ |
| Example 15 | $Li_{1.15}Ta_2P_{0.9}B_{0.1}O_{7.95}Cl_{0.05}$ |
| Example 16 | $Li_{1.25}Ta_2P_{0.875}B_{0.125}O_8$ |
| Example 17 | $Li_2Ta_2P_{0.5}B_{0.5}O_8$ |
| Example 18 | $Li_{1.5}Ta_2P_{0.75}B_{0.25}O_8$ |
| Example 19 | $Li_{1.25}Ta_2P_{0.875}Sb_{0.125}O_8$ |
| Example 20 | $Li_{1.25}Ta_{1.4}V_{0.6}P_{0.875}Sb_{0.125}O_8$ |
| Example 21 | $Li_{1.1}Ta_{1.95}In_{0.05}PO_8$ |
| Comparative Example 1 | $LiTa_2PO_8$ |
| Comparative Example 2 | $Li_{1.1}Al_{0.05}Ta_{1.95}PO_8$ |
| Comparative Example 3 | $Li_{1.1}La_{0.05}Ta_{1.95}PO_8$ |

Evaluation Example 1: Measurement of Ionic Conductivity and Activation Energy

The oxide powder of each of Example 1 to Example 4, Example 21, Comparative Example 1, Comparative Example 2, and Comparative Example 3 was pelletized by pressing at 80 MPa for 5 minutes to prepare an oxide pellet. The oxide pellet obtained by this process was completely covered by mother powder having the same composition as the oxide pellet to minimize the change in composition by lithium volatilized during heat treatment, and the resultant pellet was heat treated at a temperature of about 1100° C. for 12 hours. Then, opposite sides of the heat-treated pellet were polished using SiC sandpaper to adjust the thickness of the pellet to be around 500 μm, and then, Au electrodes were deposited on opposite sides of the pellet by sputtering to obtain the Au/oxide pellet/Au structure.

Figure 1B:
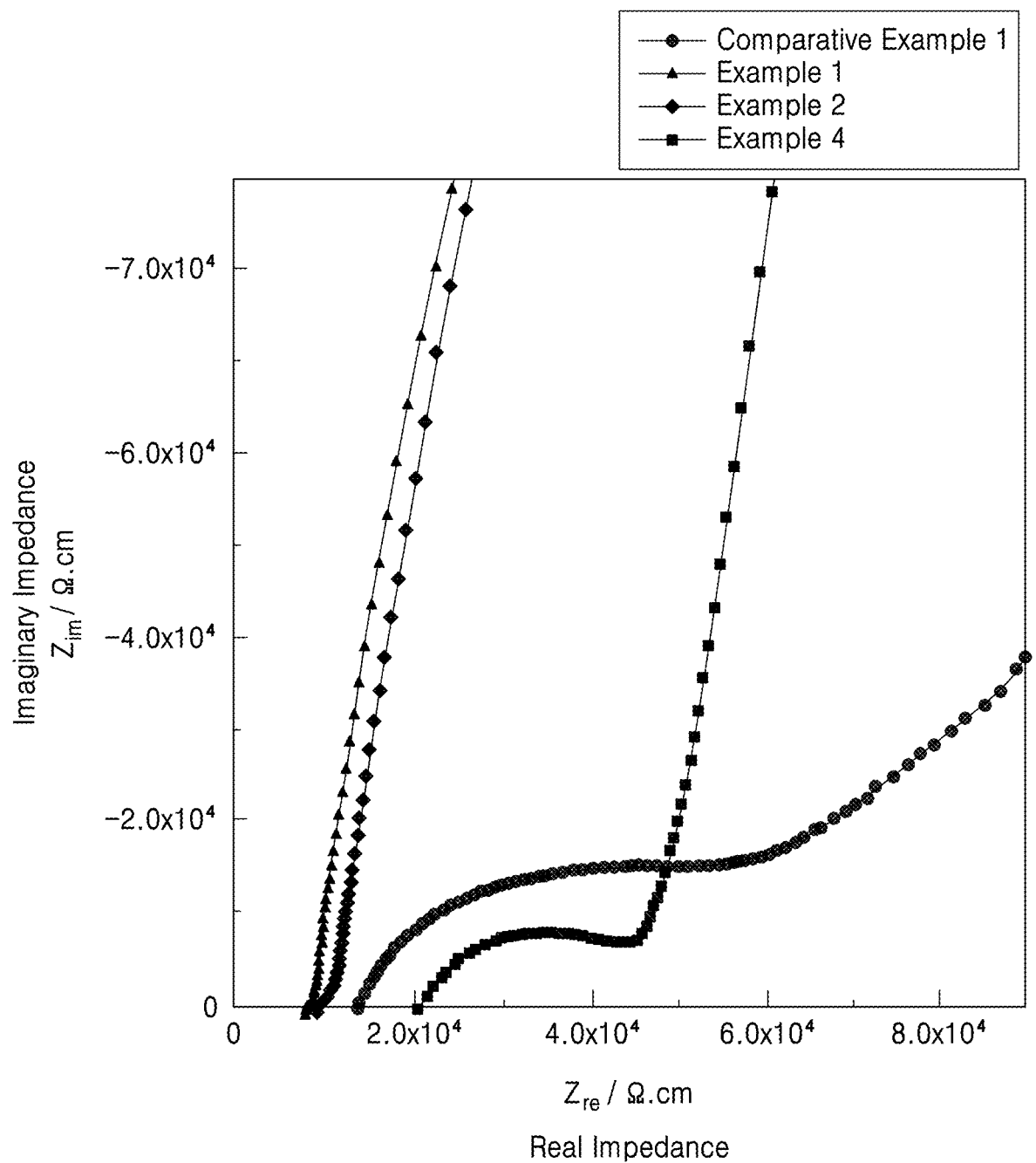
FIG. 1B is a graph of imaginary impedance ($Z_{im}$, ohm centimeter, Ω-cm) versus real impedance ($Z_{re}$, ohm centimeter, Ω-cm) showing impedance characteristics of oxides according to Examples 1, Example 2, and Example 4, and Comparative Example 1 at −20° C.

The Au/oxide pellet/Au structure was analyzed using electrochemical impedance spectroscopy (EIS). EIS analysis was performed in an air atmosphere, at an amplitude of about 10 mV, at a frequency of 0.1 Hz to $10^6$ Hz, and at a temperature of 25° C. EIS evaluation was conducted, and the results are shown in FIGS. 1A and 1B and Table 1.

The resistance value was obtained from the arc of the Nyquist plot regarding the impedance measurement result, and with the obtained resistance value, the area of an electrode and the thickness of a pellet were corrected to calculate the ionic conductivity.

In addition, the ionic conductivity according to the temperature was measured by changing the temperature of the chamber containing the pellets to −20° C. from each of 25° C., 40° C., 60° C., and 80° C. during the impedance measurement. The change in ionic conductivity according to temperature was converted into an Arrhenius plot and, from the slope obtained therefrom, the activation energy (Ea, Activation Energy) according to the Arrhenius equation represented by Equation 1 was calculated. The results are shown in Table 1 below.

$$\sigma = Ae^{(-Ea/kT)} \qquad \text{Equation 1}$$

In this equation, σ is the conductivity, A is the frequency factor, Ea is the activation energy, k is the Boltzmann constant, and T is the absolute temperature.

The ionic conductivity and activation energy analysis results obtained according to the process are shown in FIGS. 1A, 1B, and Table 2. FIG. 1A shows impedance measurement results measured at 25° C., and FIG. 1B shows impedance measurement results measured at −20° C.

TABLE 2

| Example | Composition | Σ (mS/cm @25° C.) | Activation energy (Ea) (eV/atom) |
|---|---|---|---|
| Example 1 | $Li_{1.2}Ta_2P_{0.9}B_{0.1}O_8$ | $8.0 \times 10^{-1}$ | 0.295 |
| Example 2 | $Li_{1.4}Ta_2P_{0.9}B_{0.2}O_8$ | $7.1 \times 10^{-1}$ | 0.310 |
| Example 3 | $Li_{1.6}Ta_2P_{0.9}B_{0.3}O_8$ | $4.9 \times 10^{-1}$ | 0.302 |
| Example 4 | $Li_{1.2}Ta_2P_{0.9}Sb_{0.1}O_8$ | $4.7 \times 10^{-1}$ | 0.362 |
| Example 21 | $Li_{1.1}Ta_{1.95}In_{0.05}PO_8$ | $4.6 \times 10^{-1}$ | — |
| Comparative Example 1 | $LiTa_2PO_8$ | $2.2 \times 10^{-1}$ | 0.41 |
| Comparative Example 2 | $Li_{1.1}Al_{0.05}Ta_{1.95}PO_8$ | $2.0 \times 10^{-2}$ | 0.443 |
| Comparative Example 3 | $Li_{1.1}La_{0.05}Ta_{1.95}PO_8$ | $1.9 \times 10^{-2}$ | 0.400 |

As shown in Table 2, the ionic conductivity of the oxide of Examples 1 to 4 and Example 21 was improved at room temperature (25° C.) compared to the ionic conductivity of Comparative Examples 1 to 3. As shown in FIG. 1A, the ionic conductivity of the oxides of Examples 1, 2, and 4 was improved compared to that of Comparative Example 1 because the resistance at the grain boundary was low. Referring to FIG. 1B, the oxides of Examples 1, 2, and 4 did not exhibit Li ion conduction resistance due to the grain boundary at −20° C. In addition, the activation energy of the oxides of Example 1, 2, and 4 was about 0.3 eV, which is smaller than that of the oxide of Comparative Example 1, that is, 0.41 eV. As described above, when the activation energy of an oxide is reduced, the ionic conductivity at low temperature is increased.

Evaluation Example 2: In-Situ XRD Analysis

The phase formation temperature of an oxide was evaluated using in-situ XRD analysis.

A sample (precursor mixtures of Example 1, Example 4, or Comparative Example 1) in a powder state was subjected to XRD analysis while the temperature was increased from room temperature (25° C.) to 1200° C. to identify transition temperature at which the beta phase is converted to the alpha phase (phase formation temperature). Here, the temperature at which the beta phase is converted to the alpha phase is defined as the phase formation temperature. X-ray diffraction analysis was performed using Bruker's D8 Advance, and Cu Kα radiation was used for XRD spectrum measurement.

Figure 3A:
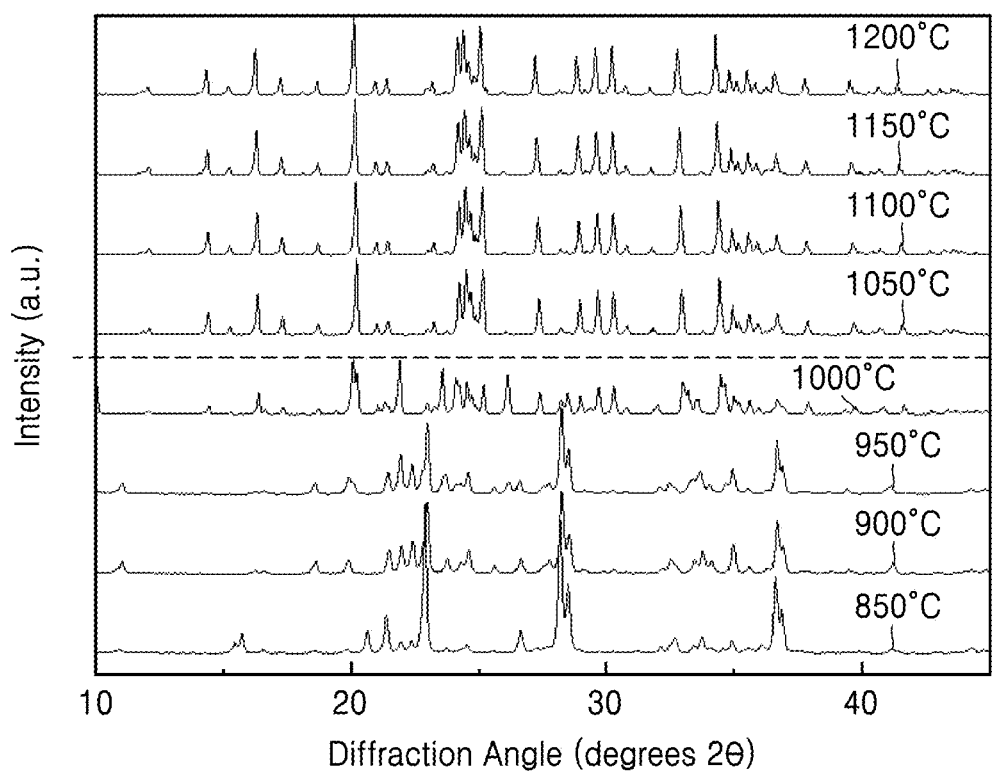
FIG. 3A is a graph of intensity (arbitrary units, a.u.) versus diffraction angle (degrees 2θ) and shows the results of an in-situ X-ray diffraction (XRD) analysis for the oxide of Example 1.
Figure 3B:
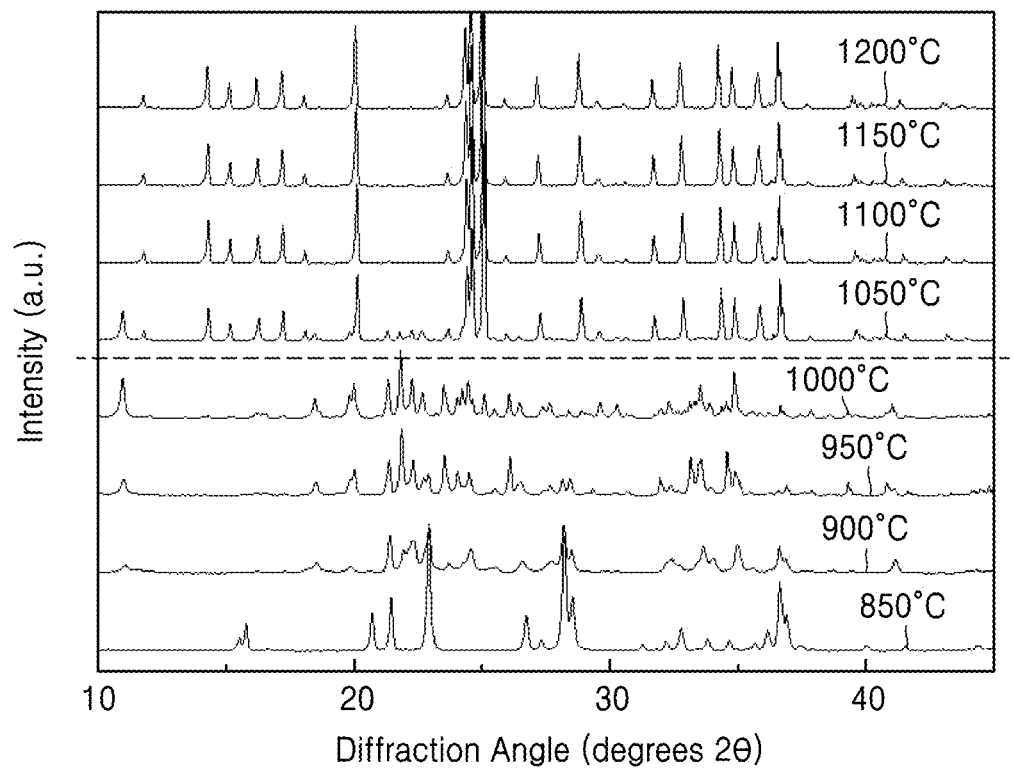
FIG. 3B is a graph of intensity (arbitrary units, a.u.) versus diffraction angle (degrees 2θ) and shows the results of an in-situ X-ray diffraction analysis of the oxide of Example 4.
Figure 3C:
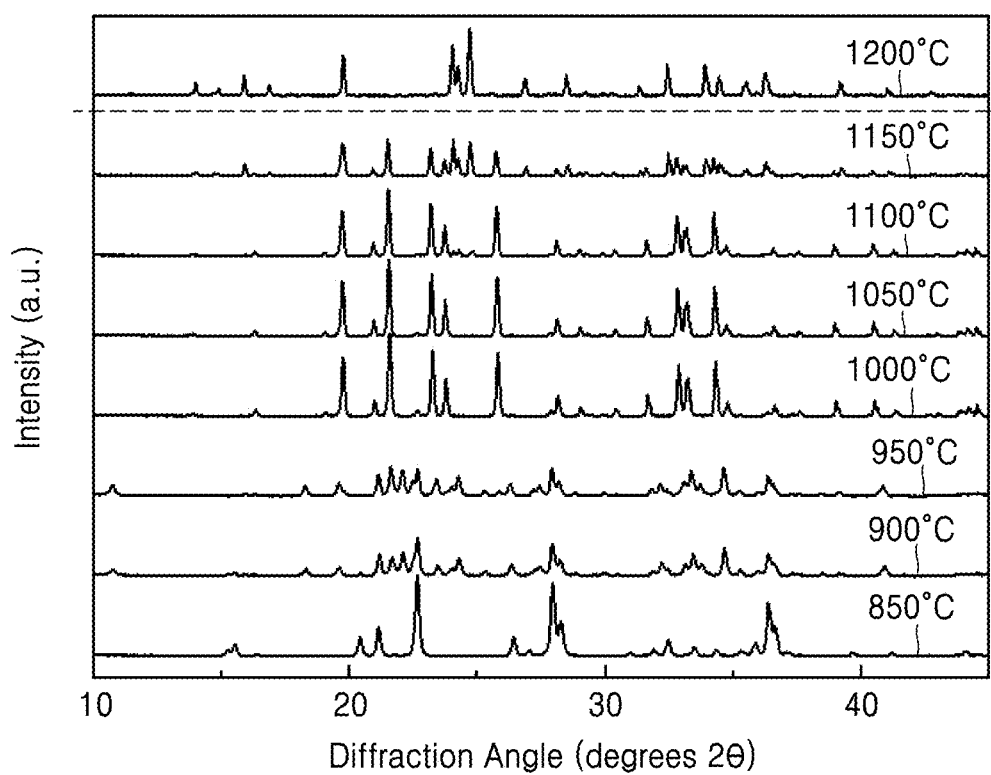
FIG. 3C is a graph of intensity (arbitrary units, a.u.) versus diffraction angle (degrees 2θ) and shows the results of an in-situ X-ray diffraction analysis of the oxide of Comparative Example 1.

The results of in-situ XRD analysis of the oxides of Example 1 and Example 4 are shown in FIGS. 3A and 3B, respectively. In addition, the results of in-situ XRD analysis of the oxide of Comparative Example 1 are shown in FIG. 3C. In the in-situ XRD analysis, the holding time at each temperature was 30 minutes and not enough and no pressure was applied. Accordingly, the phase expression appears at a temperature higher than the ex-situ (measurement after making pellets while pressing according to the actual process) result of Evaluation Example 3, which will be described later.

The oxide of Comparative Example 1, as shown in FIG. 3C, transitioned from the beta phase to the alpha phase at 1100° C. In contrast, the oxides of Example 1 and Example 4, as shown in FIGS. 3A and 3B, transitioned from the beta phase to the alpha phase at 1050° C. The oxides of Example 1 and 4 were found to be synthesized at a low temperature compared to the oxide of Comparative Example 1 because the alpha phase formation temperature thereof was decreased compared to that of Comparative Example 1.

Evaluation Example 3: Ex-Situ XRD Analysis

The oxides of Example 1, Example 4, and Comparative Example 1 were subjected to ex-situ XRD analysis, and the phase formation temperature of an oxide was evaluated according to the following method. The evaluation results are shown in FIG. 2.

The oxide powder obtained according to Example 1, Example 4 and Comparative Example 1 was pelletized, and each pellet was subjected to XRD analysis while the temperature was increased from room temperature (25° C.) to about 1200° C. to identify the temperature at which the beta phase is converted to alpha phase. Here, the temperature at which the beta phase is converted to the alpha phase is defined as the phase formation temperature. X-ray diffraction analysis was performed using Bruker's D8 Advance, and Cu Kα radiation was used for XRD spectrum measurement.

The pelletizing process using the oxide powder was as follows. Oxide powder was pressed for 5 minutes under pressure of 6 tons to obtain oxide pellets (thickness: about 500 μm). The oxide pellet obtained by this process was completely covered by mother powder having the same composition as the oxide pellet to minimize the change in composition by lithium volatilized during heat treatment, and the resultant pellet was heat treated at a temperature of about 1100° C. for 12 hours. Subsequently, both sides of the heat-treated pellet were polished using SiC sand paper to adjust the thickness of the pellet to be around 500 μm.

Figure 2:
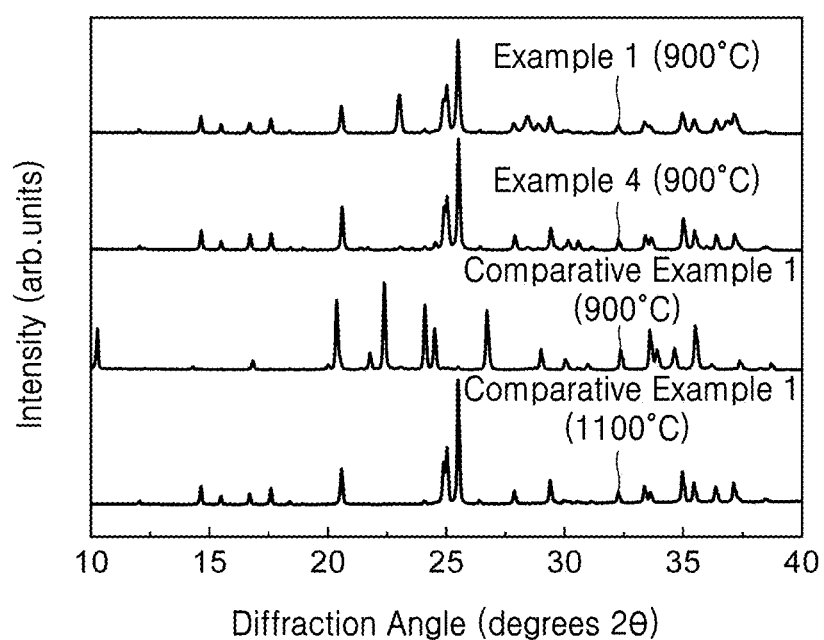
FIG. 2 is a graph of intensity (arbitrary units, a.u.) versus diffraction angle (degrees 2θ) showing the results of ex-situ X-ray diffraction analysis of oxides of Example 1, Example 4 and Comparative Example 1.

FIG. 2 shows the results of ex-situ XRD analysis at 900° C. for the oxides of Example 1 and Example 4 and the results of ex-situ XRD analysis at 900° C. and 1100° C. for the oxide of Comparative Example 1.

Referring to FIG. 2, it was confirmed that the alpha phase of the oxides of Examples 1 and 4 was observed at 900° C., and that the oxides had the same crystal structure of the oxide of Comparative Example 1 after heat treatment at 1100° C. In contrast, the oxide of Comparative Example 1 was present as $\beta$-$LiTa_2PO_8$ at about 900° C. and $\alpha$-$LiTa_2PO_8$ at about 1100° C. $\beta$-$LiTa_2PO_8$ has a crystal structure that is different from that of $\alpha$-$LiTa_2PO_8$ and the ionic conductivity thereof is lowered.

As described above, the alpha phase of the oxide of Comparative Example 1 was observed at 1100° C., and the alpha phase of the oxides of Examples 1 and 4 in which the dopant was introduced were observed at 900° C.

In contrast, with reference to FIGS. 3A and 3B of Evaluation Example 2 described above, it was confirmed that the alpha phase that appeared at 1200° C. in the case of the oxide of Comparative Example 1 when analyzed in-situ was observed at 1050° C. in the case of the oxides of Examples 1 and 4.

Evaluation Example 4: X-Ray Diffraction Analysis

The oxide powder of Examples 1 to 3, Example 5 and Comparative Example 1 was pressed for 5 minutes under pressure of 6 tons to obtain oxide pellets having thickness: about 500 μm. The oxide pellet obtained by this process was completely covered by mother powder having the same composition as the oxide pellet to minimize the change in composition by lithium volatilized during heat treatment, and the resultant pellet was heat treated at a temperature of about 1100° C. in an air atmosphere for 12 hours. Subsequently, XRD analysis was performed on the heat-treated pellets to identify the crystal structure. Here, X-ray diffraction analysis was performed using Bruker's D8 Advance, and Cu Kα radiation was used when the XRD spectrum was measured.

Figure 4A:
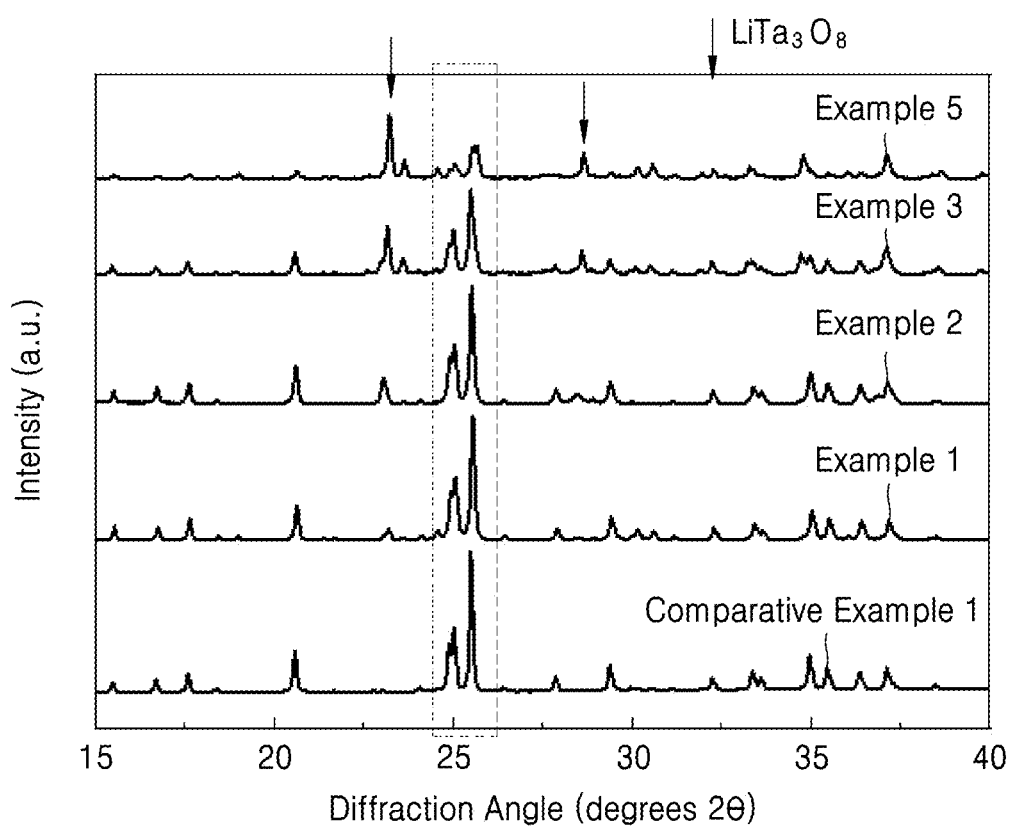
FIG. 4A is a graph of intensity (arbitrary units, a.u.) versus diffraction angle (degrees 2θ) and shows the results of ex-situ X-ray diffraction analysis of oxides of Example 1 to Example 3, Example 5, and Comparative Example 1.
Figure 4B:
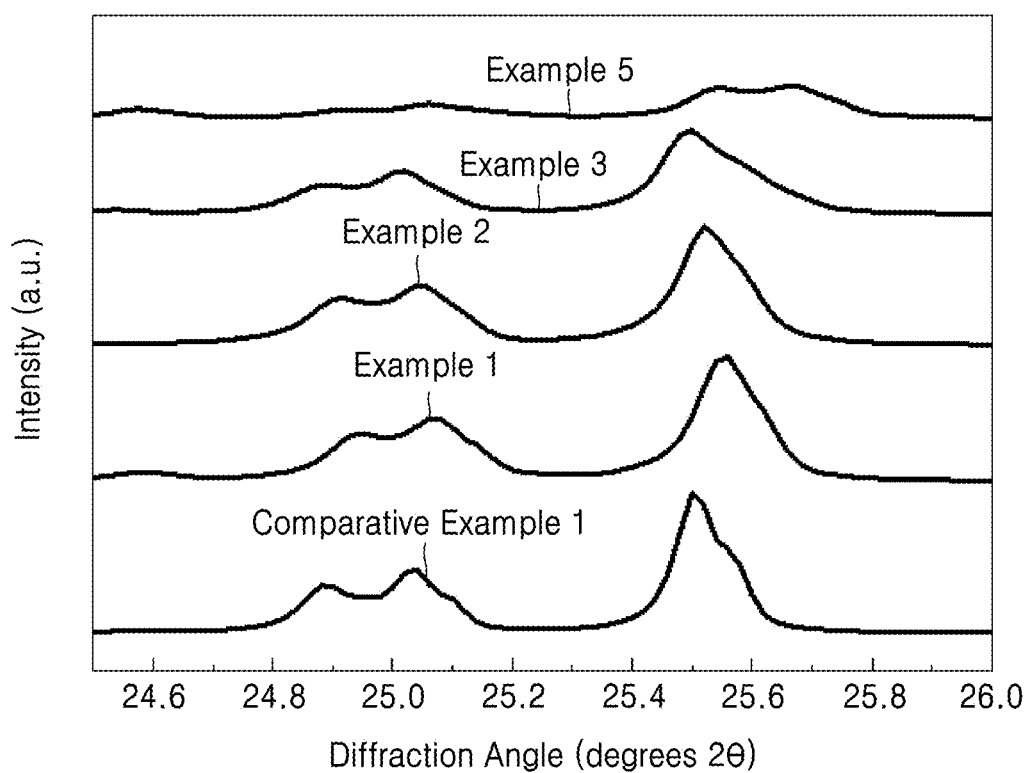
FIG. 4B is an enlarged view of the indicated area of FIG. 4A.
Figure 4C:
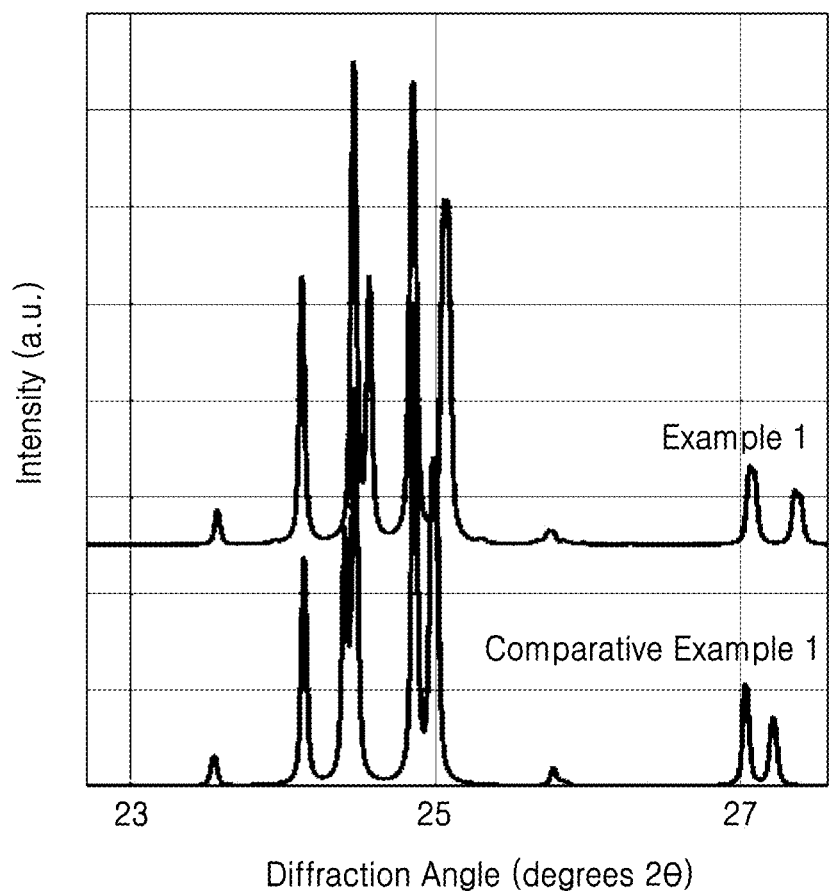
FIG. 4C is a graph of intensity (arbitrary units, a.u.) versus diffraction angle (degrees 2θ) and shows the XRD analysis results obtained as a result of calculation.

The XRD analysis results show that diffraction angle of the oxides of Examples 1 to 3 and 5 were shifted to a level of 0.06° compared to that of the oxide of Comparative Example 1 as shown in FIGS. 4A and 4B. FIG. 4B is an enlarged view of the dotted line area of FIG. 4A. This is in line with the 0.12° shift of diffraction angle of the oxide of Example 1 in the calculation results of FIG. 4C. The shift indicates that the main phase of the oxide is maintained and high ionic conductivity is maintained.

Evaluation Example 5: Scanning Electron Microscopy Analysis

The oxides of Example 1, Example 4 and Comparative Example 1 were subjected to the scanning electron microscopy analysis. The scanning electron microscope used herein for analysis was FE-SEM (Hitachi SU 8030).

Figure 9A:
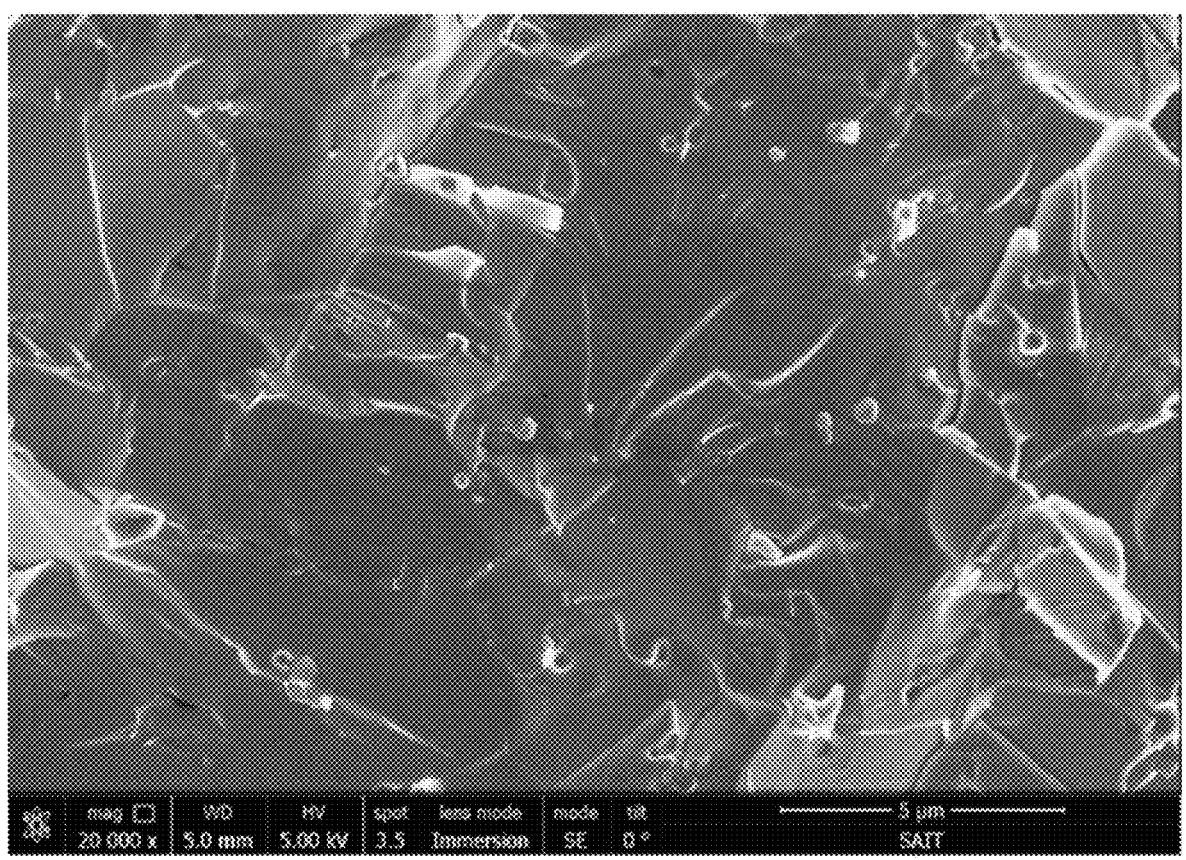
FIGS. 9A and 9B show scanning electron microscope images of the oxides of Example 1 and Example 4, respectively.
Figure 9B:
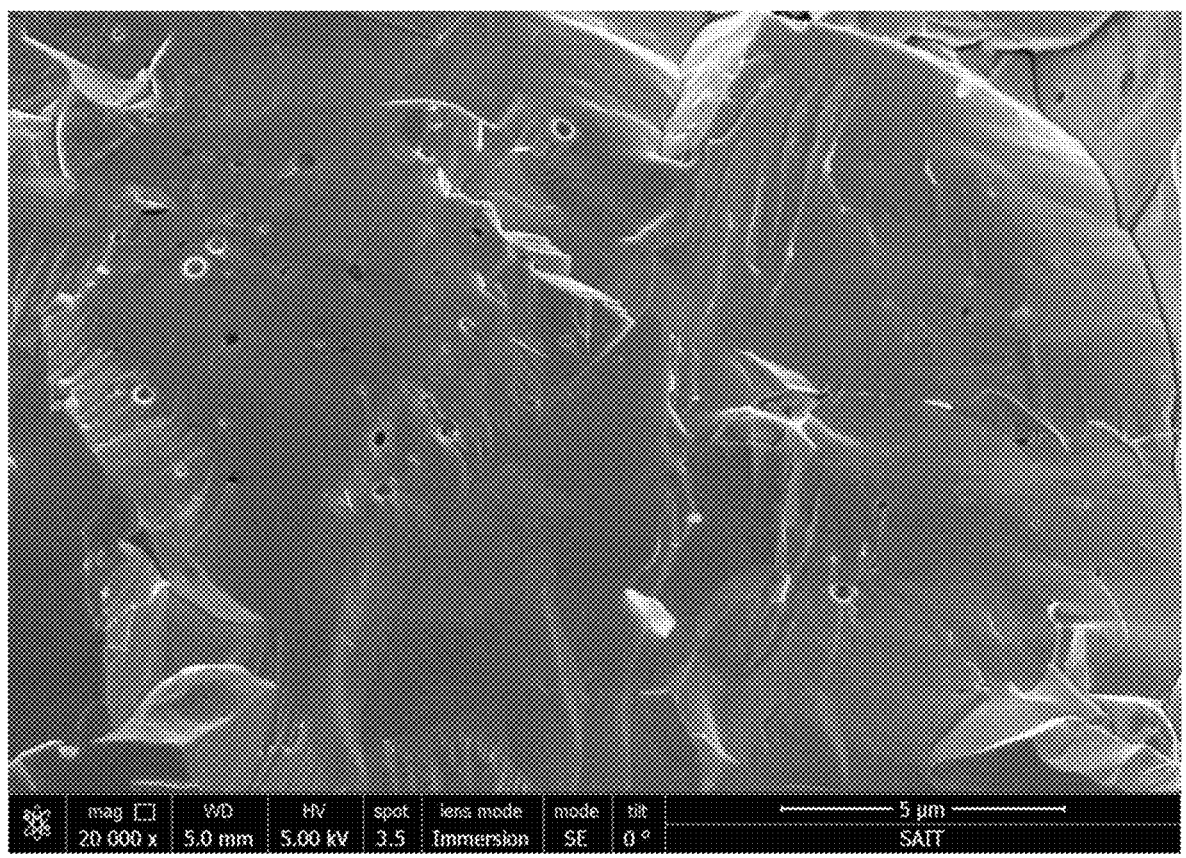
Figure 9C:
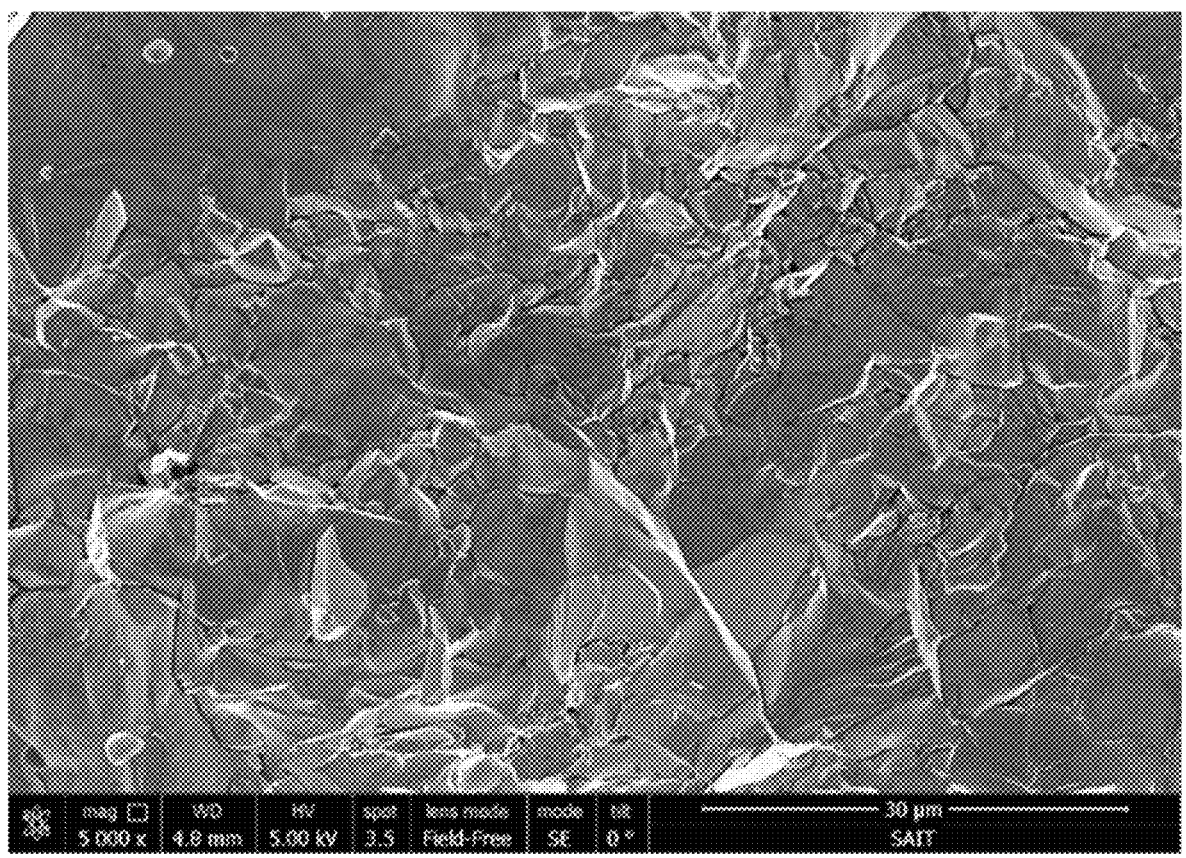
FIG. 9C shows a scanning electron microscope image of the oxide of Comparative Example 1.

The scanning electron microscope images of the oxides of Example 1 and Example 4 are shown in FIGS. 9A and 9B, respectively, and the scanning electron microscope image of the oxide of Comparative Example 1 is shown in FIG. 9C.

As shown in FIG. 9C, the oxide of Comparative Example 1 shows pores having non-uniform grain sizes, and the oxides of Examples 1 and 4 show that grain growth occurs well as shown in FIGS. 9A and 9B, and thus, the influence of grain is reduced.

Evaluation Example 6: Stability Evaluation with Positive Active Material

Regarding the oxides of Example 16 and Example 17, the stability of two positive active materials, $LiCoO_2$ (LCO) and $LiNi_{0.6}Co_{0.2}Mn_{0.2}O_2$(NCM622), was evaluated. The evaluation method was performed by an in-situ XRD analysis method. The powder of the composition according to Examples 16 or 17 and LCO powder were mixed at a volume ratio of 1:1 and pelletized, and then, XRD thereof was measured while raising the temperature to identify the temperature at which the phase change occurs.

The stability evaluation results with respect to the positive active material are shown in Tables 3 to 5 below.

Table 3 includes evaluation results obtained at a temperature of 600° C. and in an atmospheric condition containing 21 vol % of oxygen, Table 4 includes evaluation results obtained at 1000° C. and in an atmospheric condition containing 21 vol % of oxygen, and Table 5 includes evaluation results obtained at OK and in an atmospheric condition containing 21 Vol % of oxygen.

TABLE 3

| Example | Example | Example 16 | Example 17 | Comparative Example 1 |
|---|---|---|---|---|
| Condition: 600 ° C., oxygen 21 vol % | | $Li_{1.25}Ta_2P_{0.875}B_{0.125}O_8$ | $Li_2Ta_2P_{0.5}B_{0.5}O_8$ | $LiTa_2PO_8$ |
| Reaction energy | $LiCoO_2$ | −81 | −45 | −92 |
| (meV/atom) | NCM622 | −165 | −116 | −179 |

TABLE 4

| Example | Example | Example 16 | Example 17 | Comparative Example 1 |
|---|---|---|---|---|
| 1000 ° C., oxygen 21 vol % | | $Li_{1.25}Ta_2P_{0.875}B_{0.125}O_8$ | $Li_2Ta_2P_{0.5}B_{0.5}O_8$ | $LiTa_2PO_8$ |
| Reaction energy | $LiCoO_2$ | −155 | −101 | −169 |
| (meV/atom) | NCM622 | −192 | −130 | −210 |

TABLE 5

| Example | Example | Example 16 | Example 17 | Comparative Example 1 |
|---|---|---|---|---|
| OK, oxygen 21 vol % | | $Li_{1.25}Ta_2P_{0.875}B_{0.125}O_8$ | $Li_2Ta_2P_{0.5}B_{0.5}O_8$ | $LiTa_2PO_8$ |
| Reaction energy (meV/atom) | $LiCoO_2$ | −25 | −16 | −33 |
| | NCM622 | −43 | −28 | −47 |

As shown in Tables 3 to 5, the oxides of Examples 16 and 17 have smaller absolute value of the reaction energy with respect to the positive active material, compared to that of Comparative Example 1. The decrease in the absolute value of energy indicates that the reactivity of the oxides in Examples 16 and 17 with respect to a positive active material is lower than that of Comparative Example 1. This result shows that the stability of oxides to positive active materials is further improved.

Evaluation Example 7: Calculation of Phase Stability

The phase stability was evaluated by calculating the energy above hull of the oxides prepared according to Examples 16 to 19 and Comparative Example 1. In addition, the impurity phase, which may be generated by decomposition or the like during synthesis, was calculated. The calculation results are shown in Table 6 below. Energy above hull was calculated from the framework of the density functional theory (DFT) using the Vienna ab initio simulation package (VASP).

TABLE 6

| | Oxide composition | Energy above hull (meV/atom) | Decomposition products |
|---|---|---|---|
| Example 16 | $Li_{1.25}Ta_2P_{0.875}B_{0.125}O_8$ | 29 | $Ta_9PO_{25}$, $TaPO_5$, $Li_3PO_4$, $TaBO_4$ |
| Example 17 | $Li_{1.2}Ta_2P_{0.5}B_{0.5}O_8$ | 40 | $Ta_9PO_{25}$, $LiTaO_3$, $Li_3PO_4$, $Li_3B_7O_{12}$ |
| Example 18 | $Li_{1.5}Ta_2P_{0.75}B_{0.25}O_8$ | 38 | $Ta_9PO_{25}$, $TaPO_5$, $Li_3PO_4$, $TaBO_4$ |
| Example 19 | $Li_{1.25}Ta_2P_{0.875}Sb_{0.125}O_8$ | 34 | $Ta_9PO_{25}$, $TaPO_5$, $Li_3PO_4$, $LiSbO_3$ |
| Comparative Example 1 | $LiTa_2PO_8$ | 21 | $Ta_9PO_{25}$, $TaPO_5$, $Li_3PO_4$ |

As shown in Table 6, the oxides of Example 16 to 19 have a low energy above hull of 40 meV/atom or less, indicating that the phase stability of the oxides was good.

Evaluation Example 8: Calculation of Electrochemical Stability

The electrochemical stability and reactivity of the oxides of Examples 16 to 19 and the oxide of Comparative Example 1 to lithium metal were calculated, and the results thereof are shown in Table 7 below.

The stable electrochemical window for Li metal was calculated from the framework of the density functional theory (DFT) using the Vienna ab initio simulation package (VASP).

TABLE 7

| | Oxide composition | Electrochemical window (V) |
|---|---|---|
| Example 16 | $Li_{1.25}Ta_2P_{0.875}B_{0.125}O_8$ | [2.01-4.01] |
| Example 17 | $Li_{1.2}Ta_2P_{0.5}B_{0.5}O_8$ | [1.92-3.94] |
| Example 18 | $Li_{1.5}Ta_2P_{0.75}B_{0.25}O_8$ | [2.01-4.01] |
| Example 19 | $Li_{1.25}Ta_2P_{0.875}Sb_{0.125}O_8$ | [2.96-4.01] |
| Comparative Example 1 | $LiTa_2PO_8$ | [2.01-4.01] |

Referring to Table 7, the oxides of Examples 16 and 18 showed a stable electrochemical window for lithium metal in the range of 2.01 V to 4.01 V, the oxide of Example 17 showed a stable electrochemical window in the range of 1.92 V to 3.94 V, and the oxide of Example 19 showed a stable electrochemical window in the range of 2.96 V to 4.01 V. The oxide of Comparative Example 1 showed a stable electrochemical window in the range of 2.01 V to 4.01 V for lithium metal.

The oxide of Example 1 was stable against lithium metal up to the same high oxidation potential as the oxide of Comparative Example 1.

Evaluation Example 9: SEM-EDS Analysis

The compositions of the oxides of Examples 1 and 2 were confirmed by SEM-EDS analysis.

Figure 5A:
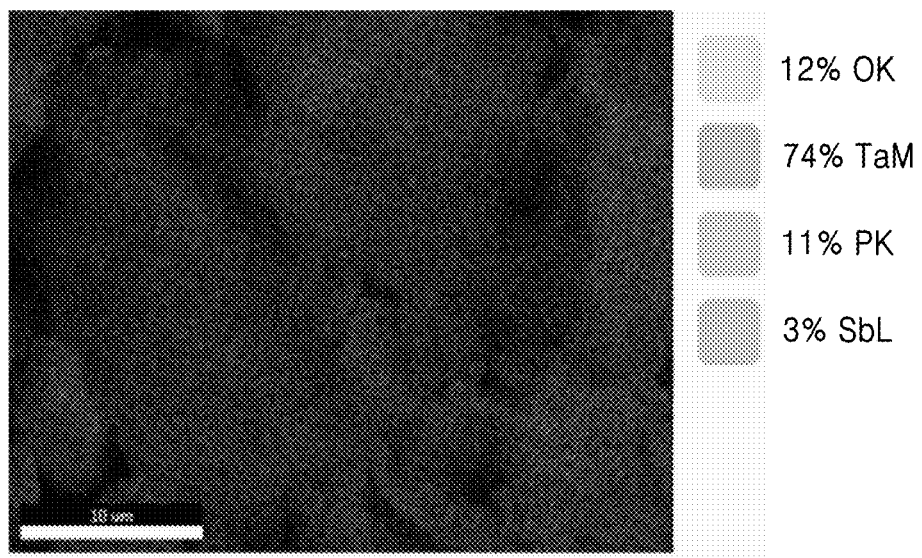
FIG. 5A shows the results of analysis of the oxide of Example 4 obtained by a scanning electron microscope-energy dispersive spectrometer (SEM-EDS)
Figure 5B:
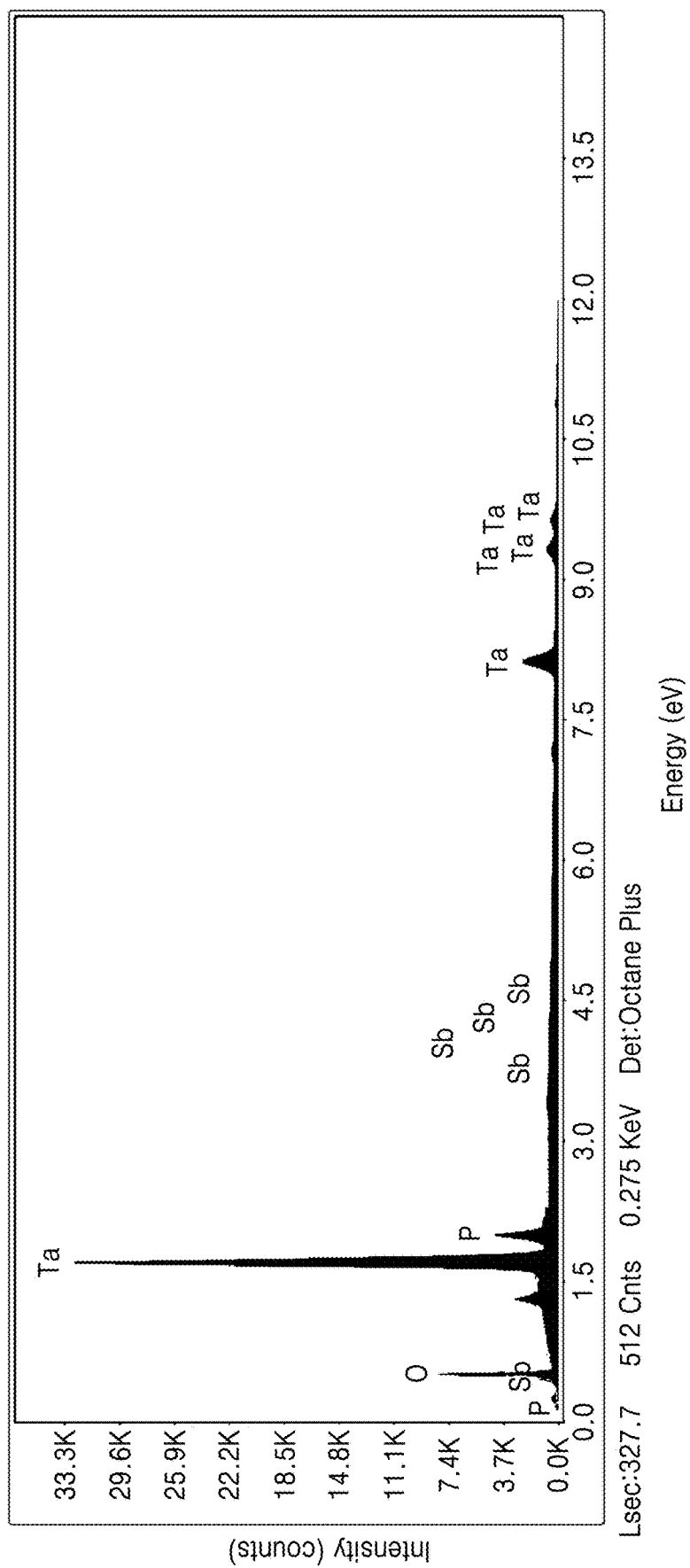
FIG. 5B is a graph of intensity (counts) versus energy (electron-volts, eV) and shows the results of analysis of the oxide of Example 4 obtained by a scanning electron microscope-energy dispersive spectrometer (SEM-EDS)

SEM-EDS analysis was performed to analyze the composition for Example 4. The analysis was performed using FEI's NovaNano SEM 450, and the analysis results are as shown in FIGS. 5A and 5B. Referring to FIGS. 5A and 5B, the X axis represents the energy (eV) when the electrons excited by scanning an electron beam are stabilized, and the eV range varies depending on each material. Accordingly, constituting elements of a material can be identified according to the position of a corresponding peak. The Y axis represents the relative amount of each element because the Y axis is the count of energy (in the form of X-rays) observed in each eV range, that is, the intensity of energy.

The oxide according to an embodiment may be used as a lithium ion conductor. Such a lithium ion conductor has excellent ionic conductivity, can be synthesized at low temperatures, has improved lithium stability, and has a high oxidation potential. Accordingly, the lithium ion conductor can be used as an electrolyte for a positive electrode. Such a lithium ion conductor enables the manufacturing of an electrochemical battery with improved performance.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An oxide comprising a compound represented by Formula 1:

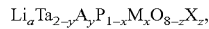

$Li_aTa_{2-y}A_yP_{1-x}M_xO_{8-z}X_z$,     Formula 1 wherein in Formula 1, M is an element having an oxidation number of +3, and M is aluminum, gallium, indium, antimony, boron, or a combination thereof, A is an element having an oxidation number of +4, +5, or +6, or a combination thereof, wherein when A is an element having an oxidation number of +4, a is $1+y+2x-z$, when A is an element having an oxidation number of +5, a is $1+2x-z$, when A is an element having an oxidation number of +6, a is $1-y+2x-z$, when A is not present, a is $1+2x-z$, X is a halogen atom, a pseudohalogen, or a combination thereof, and $0 \leq y < 0.6$, $0 \leq x < 1$, and wherein when M is aluminum, gallium, indium, antimony, or a combination thereof, then $0 \leq z < 1$, and when M comprises boron then $0 < z < 1$, with the proviso that x, y and z are not 0 at the same time.

2. The oxide of claim 1, wherein y and z in Formula 1 are each 0, and the compound represented by Formula 1 is a compound represented by Formula 2 or a compound represented by Formula 2-1:

$$Li_{1+2x}Ta_2P_{1-x}M_xO_8 \qquad \text{Formula 2}$$

wherein M in Formula 2 is an element having an oxidation number of +3 and is aluminum, gallium, indium, antimony, or a combination thereof, and $0 < x \leq 0.5$, or $$LiTa_2PO_8 \cdot M_2O_3 \qquad \text{Formula 2-1}$$

wherein M in Formula 2-1 is an element having an oxidation number of +3 and is aluminum, gallium, indium, antimony, or a combination thereof.

3. The oxide of claim 2, wherein x in Formula 2 and Formula 2-1 is greater than 0 and less than or equal to 0.3.

4. The oxide of claim 1, wherein M is boron, aluminum, gallium, indium, antimony, or a combination thereof.

5. The oxide of claim 1, wherein in the compound of Formula 1 is in a crystalline form, Ta is 6-coordinated by oxygen anion to form a $TaO_6$ octahedral unit, P is 4-coordinated by oxygen anion to form a $P_{1-x}M_xO_4$ tetrahedral unit, and M resides on a Ta site.

6. The oxide of claim 1, wherein the oxide has a monoclinic crystal structure having a space group of c2/c.

7. The oxide of claim 1, wherein, when analyzed by X-ray diffraction using CuKa radiation, the compound of Formula 1 has peaks at a diffraction angle of $17.5° 2\theta \pm 0.5° 2\theta$, $24.8° 2\theta \pm 0.5° 2\theta$, $24.9° 2\theta \pm 0.5° 2\theta$, $25.4° 2\theta \pm 0.5° 2\theta$, and/or $27.8° 2\theta \pm 0.5° 2\theta$.

8. The oxide of claim 1, wherein when analyzed by X-ray diffraction using CuKα radiation, the compound of Formula 1 has a peak at a diffraction angle of $25.4° 2\theta \pm 0.5° 2\theta$ that is about 0.02° to about 0.12° less than a peak of $LiTa_2PO_8$ at a diffraction angle of $25.5° 2\theta$.

9. The oxide of claim 1, wherein the oxide has a lithium ion conductivity of $1 \times 10^{-2}$ mS/cm or more at 25° C.

10. The oxide of claim 1, wherein an apparent density of the oxide is 92% or less and a lithium ion conductivity at 25° C. is $1 \times 10^{-2}$ mS/cm or more.

11. The oxide of claim 1, wherein the compound represented by Formula 1 has an energy above hull of less than or equal to 50 meV/atom.

12. The oxide of claim 1, wherein the compound represented by Formula 1 has a phase formation temperature of 1150° C. or less.

13. The oxide of claim 1, wherein the oxide is $Li_{1.4}Ta_2P_{0.8}In_{0.2}O_8$, $Li_{1.6}Ta_2P_{0.7}In_{0.3}O_8$, $Li_{1.4}Ta_2P_{0.8}Ga_{0.2}O_8$, $Li_{1.6}Ta_2P_{0.7}Ga_{0.3}O_8$, $Li_{1.1}Ta_2P_{0.9}B_{0.1}O_{7.9}Cl_{0.1}$, $Li_{1.15}Ta_2P_{0.9}B_{0.1}O_{7.95}Cl_{0.05}$, $Li_{1.2}Ta_2P_{0.9}Sb_{0.1}O_8$, $Li_{1.4}Ta_2P_{0.8}Sb_{0.2}O_8$, $Li_{1.6}Ta_2P_{0.7}Sb_{0.3}O_8$, $Li_{1.8}Ta_2P_{0.6}Sb_{0.4}O_8$, $Li_2Ta_2P_{0.5}Sb_{0.5}O_8$, $Li_{1.25}Ta_2P_{0.875}Sb_{0.125}O_8$, $Li_{1.15}Ta_2P_{0.9}Sb_{0.1}O_{7.95}Cl_{0.05}$, $Li_{1.15}Ta_2P_{0.9}Sb_{0.1}O_{7.95}Cl_{0.05}$, $Li_{1.2}Ta_2P_{0.9}Ga_{0.1}O_8$, $Li_{1.4}Ta_2P_{0.8}Ga_{0.2}O_8$, $Li_{1.6}Ta_2P_{0.7}Ga_{0.3}O_8$, $Li_{1.8}Ta_2P_{0.6}Ga_{0.4}O_8$, $Li_2Ta_2P_{0.5}Ga_{0.5}O_8$, $Li_{1.25}Ta_2P_{0.875}Ga_{0.125}O_8$, $Li_{1.1}Ta_2P_{0.9}Ga_{0.1}O_{7.95}Cl_{0.1}$, $Li_{1.15}Ta_2P_{0.9}Ga_{0.1}O_{7.95}Cl_{0.05}$, $Li_{1.2}Ta_2P_{0.9}In_{0.1}O_8$, $Li_{1.4}Ta_2P_{0.8}In_{0.2}O_8$, $Li_{1.6}Ta_2P_{0.7}In_{0.3}O_8$, $Li_{1.8}Ta_2P_{0.6}In_{0.4}O_8$, $Li_2Ta_2P_{0.5}In_{0.5}O_8$, $Li_{1.25}Ta_2P_{0.875}In_{0.125}O_8$, $Li_{1.1}Ta_2P_{0.9}In_{0.1}O_7O_{7.95}Cl_{0.1}$, $Li_{1.15}Ta_2P_{0.9}In_{0.1}O_{7.95}Cl_{0.05}$, $Li_{1.25}Ta_{1.4}V_{0.6}P_{0.875}Sb_{0.125}O_8$, $Li_{1.1}Ta_{1.95}In_{0.05}PO_8$, or a combination thereof.

14. A protected positive electrode comprising:
a positive electrode layer; and
a solid electrolyte comprising the oxide of claim 1 on the positive electrode layer.

15. An electrochemical device comprising:
a positive electrode layer;
a solid electrolyte layer comprising the oxide of claim 1 on the positive electrode layer; and
a negative electrode layer on the solid electrolyte.

16. The electrochemical device of claim 15, wherein the electrochemical device is an electrochemical cell, a storage cell, a supercapacitor, a fuel cell, a sensor, or a color change device.

17. An electrochemical cell comprising:
a positive electrode layer comprising a positive electrode current collector and a positive active material layer disposed on the positive electrode current collector;
a negative electrode layer comprising a negative electrode current collector and a first negative active material layer disposed on the negative electrode current collector,
wherein the first negative active material layer comprises a negative active material and a binder; and
a solid electrolyte layer comprising a solid electrolyte disposed between the positive electrode layer and the negative electrode layer, wherein the positive active material layer, the solid electrolyte layer, or a combination thereof comprises the oxide of claim 1.

18. The electrochemical cell of claim 17, wherein the electrochemical cell is an all-solid secondary battery.

19. The electrochemical cell of claim 17, wherein the negative active material comprises a mixture of amorphous carbon and at least one of gold, platinum, palladium, silicon, silver, aluminum, bismuth, tin, or zinc.

20. The electrochemical cell of claim 17, wherein the negative electrode layer further comprises a metal layer disposed between the negative electrode current collector and the negative active material layer, and the metal layer comprises lithium or a lithium alloy.

21. The electrochemical cell of claim 17, wherein the negative active material comprises at least one of a carbon-based negative active material or a metal or metalloid negative active material,
wherein the carbon-based negative active material comprises amorphous carbon, crystalline carbon, or a combination thereof.

22. The electrochemical cell of claim 21, wherein the metal or metalloid negative active material comprises at least one of gold, platinum, palladium, silicon, silver, aluminum, bismuth, tin, or zinc.

23. The electrochemical cell of claim 17, wherein the negative active material comprises a mixture of
first particles comprising amorphous carbon, and
second particles comprising a metal or metalloid, and an amount of the second particles is about 8 wt % to about 60 wt %, based on a total weight of the mixture.

24. The electrochemical cell of claim 17, further comprising:
a second negative active material layer disposed between the negative electrode current collector and the first negative active material layer, or between the solid electrolyte layer and the first negative active material layer, or a combination thereof, wherein the second negative active material layer comprises a metal layer comprising lithium or a lithium alloy.

25. A method of manufacturing an electrochemical cell, the method comprising:
providing a positive electrode layer comprising a positive electrode current collector and a positive active material layer disposed on the positive electrode current collector;
providing a negative electrode layer comprising a negative electrode current collector and a first negative active material layer disposed on the negative electrode current collector; and
disposing a solid electrolyte layer between the positive electrode layer and the negative electrode layer to manufacture the electrochemical battery, the solid electrolyte layer comprising a solid electrolyte,
wherein at least one of the positive active material layer or the solid electrolyte layer comprises the oxide of claim 1.

26. A method of preparing an oxide, the method comprising: mixing a lithium precursor, a tantalum precursor, an M precursor, and a phosphorus precursor to provide a precursor mixture; and
heat-treating the precursor mixture in an oxidizing gas atmosphere to form the oxide, the oxide comprising a compound of Formula 1

$$Li_aTa_{2-y}A_yP_{1-x}M_xO_{8-z}X_z,$$ Formula 1 wherein, in Formula 1, M is an element having an oxidation number of +3 and is aluminum, gallium, indium, antimony, boron, or a combination thereof,
A is an element having an oxidation number of +4, +5, or +6, or a combination thereof,
when A is an element having an oxidation number of +4, a is $1+y+2x-z$,
when A is an element having an oxidation number of +5, a is $1+2x-z$,
when A is an element having an oxidation number of +6, a is $1-y+2x-z$,
when A is not present, a is $1+2x-z$,
X is a halogen atom, a pseudohalogen, or a combination thereof, and
$0 \leq y < 0.6$, $0 \leq x < 1$, and
wherein when M is aluminum, gallium, indium, antimony, or a combination thereof, then $0 \leq z < 1$, and when M comprises boron then $0 < z < 1$, with the proviso that x, y and z are not 0 at the same time.

27. The method of claim 26, wherein the providing of the precursor mixture further comprises contacting the mixture with at least one of an A precursor or an X precursor.

28. The method of claim 26, wherein the heat treating comprises heat-treating at a temperature of about 500° C. to about 1000° C.

29. The method of claim 26, wherein the mixing is performed by mechanical milling.

* * * * *